United States Patent
Kato et al.

(10) Patent No.: US 7,315,773 B2
(45) Date of Patent: Jan. 1, 2008

(54) VEHICLE MOTION CONTROL METHOD AND VEHICLE MOTION CONTROL APPARATUS

(75) Inventors: Hiroaki Kato, Hekinan (JP); Minekazu Momiyama, Chiryu (JP); Takayuki Ohta, Okazaki (JP)

(73) Assignee: JTEKT Corporation, Chuo-ku (JP)

( * ) Notice: Subject to any disclaimer, the term of this patent is extended or adjusted under 35 U.S.C. 154(b) by 694 days.

(21) Appl. No.: 10/811,843

(22) Filed: Mar. 30, 2004

(65) Prior Publication Data

US 2004/0199316 A1 Oct. 7, 2004

(30) Foreign Application Priority Data

Apr. 2, 2003 (JP) ............... 2003-099314

(51) Int. Cl.
*B62D 6/00* (2006.01)
*G06F 19/00* (2006.01)

(52) U.S. Cl. ............... 701/41; 701/42; 701/70; 701/88; 180/422; 180/446

(58) Field of Classification Search ........... 701/41, 701/42, 70, 88, 89; 180/400, 446, 422, 443; 340/438; 318/52
See application file for complete search history.

(56) References Cited

U.S. PATENT DOCUMENTS

| | | | |
|---|---|---|---|
| 5,258,912 A | | 11/1993 | Ghoneim et al. |
| 5,267,160 A | * | 11/1993 | Ito et al. .................. 701/42 |
| 5,480,219 A | | 1/1996 | Kost et al. |
| 5,737,714 A | * | 4/1998 | Matsuno et al. ........... 701/89 |
| 6,091,214 A | * | 7/2000 | Yamawaki et al. ......... 318/52 |
| 6,415,215 B1 | * | 7/2002 | Nishizaki et al. .......... 701/70 |
| 6,954,140 B2 | * | 10/2005 | Holler ....................... 340/438 |

FOREIGN PATENT DOCUMENTS

| | | |
|---|---|---|
| DE | 40 10277 A1 | 10/1990 |
| DE | 100 49 565 A1 | 5/2001 |
| DE | 100 59 689 A1 | 6/2001 |
| EP | 0 318 688 A1 | 6/1989 |
| JP | 4-342667 | 11/1992 |
| JP | 6-99800 | 4/1994 |
| JP | 7-215193 | 8/1995 |
| JP | 8-332933 | 12/1996 |
| JP | 8-332971 | 12/1996 |
| JP | 11-152057 | 6/1999 |
| JP | 2001-158372 | 6/2001 |
| WO | WO 90/14980 | 12/1990 |
| WO | WO 02/14137 A1 | 2/2002 |
| WO | WO 02/083471 A1 | 10/2002 |

* cited by examiner

*Primary Examiner*—Tan Q. Nguyen
(74) *Attorney, Agent, or Firm*—Oblon, Spivak, McClelland, Maier & Neustadt, P.C.

(57) ABSTRACT

This invention provides a vehicle motion control method and a vehicle motion control apparatus capable of improving the behavior stability of a vehicle. According to the vehicle motion control method, vehicle steering characteristic is determined based on a behavior amount differentiated value obtained by differentiating (S203) a slip angle differential value which is a behavior amount of the vehicle which occurs around a z-axis in the vertical direction with respect to the vehicle body (S205, S209). Consequently, because the phase of the slip angle differential value is progressed, the transition tendency of the steering characteristic, that is, which the vehicle motion condition is moved to over-steer or under-steer, can be obtained early. Therefore, the starting timing of the steering control or drive power control of the vehicle can be accelerated thereby improving the behavior stability of the vehicle.

16 Claims, 15 Drawing Sheets

(A)

(B)

(C)

(A)

(B)

(C)

(A)

(B)

(C)

VEHICLE MOTION CONTROL METHOD AND VEHICLE MOTION CONTROL APPARATUS

CROSS-REFERENCE TO RELATED APPLICATION

The present application claims priority under 35 U.S.C. §119 to Japanese Patent Application No. JP2003-099314. The content of the application is incorporated herein by reference.

BACKGROUND OF THE INVENTION

1. Field of the Invention

The present invention relates to a vehicle motion control method and vehicle motion control apparatus for controlling the steering of the vehicle or controlling the drive power of the vehicle based on a steering characteristic obtained according to the amount of a vehicle behavior which is generated around an axis in the vertical direction of the vehicle.

2. Description of the Related Art

According to a conventional technology for estimating the vehicle steering characteristic such as over-steer, under-steer and neutral-steer, for example, a front wheel slip angle $\beta_f$ and a rear wheel slip angle $\beta_r$ are estimated based on a vehicle velocity V, actual steering angle $\delta$ and the like using a two-wheel model as shown in FIG. 15 and then, the amount of vehicle behavior is estimated from a differential $(\beta_f - \beta_r)$. According to another example of the conventional technology, the amount of the vehicle behavior is estimated from a differential between an object yaw rate computed using the same model and an actual yaw rate outputted from a yaw rate sensor (patent documents 1-3). These steering characteristics are used by a system which enhances the behavior stability of a vehicle by carrying out feed-back control based on the amount of the vehicle behavior.

[Prior Art]

JP HEI5-294173 A(pp. 2-12, FIGS. 1-4) is incorporated herein by reference.

JP HEI7-25256 A (pp. 2-7, FIGS. 1-12) is incorporated herein by reference.

JP 2000-142362 A (pp. 2-6, FIGS. 1-3) is incorporated herein by reference.

According to the conventional technology for estimating the steering characteristic by using such a vehicle two-wheel model, the steering characteristic is estimated from a differential between an object vehicle yaw rate which is generated when a vehicle driver turns the steering wheel and an actual yaw rate which a sensor obtains by detection. As a result, the processing for determining the steering characteristic is executed with a delay. Thus, there is such a problem that this delay can become a technological obstacle to securing the behavior stability rapidly in a system which obtains the behavior stability of a vehicle based on the steering characteristic.

Further, because the processing for determining the steering characteristic is executed with a delay in the system for obtaining the vehicle behavior stability, there is a problem that a skilled vehicle driver who has acquired a high-level driving skill may be provided with steering feeling as if a counter steering action at the time of steering operation upon cornering is controlled with a delay. This is the same as when the steering characteristic is estimated by obtaining a differential $(\beta_f - \beta_r)$ of the slip angles in the front and rear wheels.

On the other hand, in the system for enhancing the vehicle behavior stability by executing feedback control based on the steering characteristic and the amount of the vehicle behavior, the control for raising the responsiveness of the feedback control may intensify the over-steer. Therefore, there is another problem that securing of the vehicle behavior stability may be obstructed.

SUMMARY OF THE INVENTION

The present invention has been achieved to solve the above-described problem and an object of the present invention is to provide a vehicle motion control method and vehicle motion control apparatus capable of improving the vehicle behavior stability.

Another object of the present invention is to provide a vehicle motion control method and vehicle motion control apparatus capable of suppressing a feeling of disharmony in vehicle driver's steering operation.

According to the present invention, a vehicle motion control method for executing steering control or drive power control for the vehicle based on steering characteristic of the vehicle obtained based on the behavior amount of the vehicle which occurs around an axis in the vertical direction with respect to the vehicle body, comprising:

behavior amount acquiring step of acquiring the behavior amount of said vehicle;

differentiation step of obtaining a behavior amount differentiated value by differentiating said behavior amount; and steering characteristic determination step of determining said vehicle steering characteristic based on said behavior amount differentiated value. The "axis in the vertical direction" refers to z-axis when it is assumed that the back-and-forth direction of the vehicle is x-axis, the width direction of the vehicle is y-axis and the height direction of the vehicle is z-axis.

According to the present invention, a vehicle motion control apparatus for executing steering control or drive power control for the vehicle based on steering characteristic of the vehicle obtained based on the behavior amount of the vehicle which occurs around an axis in the vertical direction with respect to the vehicle body, comprising:

behavior amount acquiring means for acquiring the behavior amount of said vehicle;

differentiation means for obtaining a behavior amount differentiated value by differentiating said behavior amount; and steering characteristic determination means for determining said vehicle steering characteristic based on said behavior amount differentiated value.

According to the first and sixth aspects of the present invention, the behavior amount of the vehicle which is generated around an axis in the vertical direction with respect to its vehicle body is obtained and the vehicle steering characteristic is determined based on a behavior amount differentiated value obtained by differentiating this behavior amount. Consequently, because the phase of the vehicle behavior amount is progressed when the vehicle behavior amount is differentiated, the transition tendency of the steering characteristic, that is, which the vehicle motion condition is moved to over-steer or under-steer can be obtained early. Therefore, the starting timing of the vehicle steering control or drive power control can be accelerated, thereby improving the vehicle behavior stability.

The vehicle motion control method in accordance with the more preferred teaching of the present invention, said behavior amount is a difference in angle between the front wheel slip angle of a front wheel of said vehicle and the rear wheel slip angle of a rear wheel of said vehicle.

The vehicle motion control apparatus in accordance with the more preferred teaching of the present invention, said behavior amount is a difference in angle between the front wheel slip angle of a front wheel of said vehicle and the rear wheel slip angle of a rear wheel of said vehicle.

According to the second and seventh aspects of the present invention, because the vehicle behavior amount is a difference in angle between the front wheel slip angle of a front wheel of the vehicle and the rear wheel slip angle of a rear wheel of the vehicle, the vehicle steering characteristic can be determined without obtaining or detecting the yaw rate. The difference in angle between the front wheel slip angle and the rear wheel slip angle is obtained based on an actual steering angle of the steered vehicle wheel and the velocity of the vehicle. Thus, the front wheel slip angle and rear wheel slip angle do not need to be obtained. Therefore, the vehicle steering characteristic can be determined without providing with a detecting means (for example, detection sensor) for detecting each slip angle.

The vehicle motion control method in accordance with the more preferred teaching of the present invention, said steering characteristic determination step contains over-steer characteristic determination step in which even if said behavior amount falls under the under-steer characteristic, if it exceeds a predetermined under-steer determination value in the vicinity of neutral steer determination value while said behavior amount differentiated value is positive, it is determined that the steering characteristic is over-steer; and under-steer characteristic determination step in which even if said behavior amount falls under the over-steer characteristic, if it is below a predetermined over-steer determination value in the vicinity of neutral steer determination value while said behavior amount differentiated value is negative, it is determined that the steering characteristic is under-steer.

The vehicle motion control method in accordance with the more preferred teaching of the present invention, said steering characteristic determination means contains over-steer characteristic determination means in which even if said behavior amount falls under the under-steer characteristic, if it exceeds a predetermined under-steer determination value in the vicinity of neutral steer determination value while said behavior amount differentiated value is positive, it is determined that the steering characteristic is over-steer; and under-steer characteristic determination means in which even if said behavior amount falls under the over-steer characteristic, if it is below a predetermined over-steer determination value in the vicinity of neutral steer determination value while said behavior amount differentiated value is negative, it is determined that the steering characteristic is under-steer.

According to the third and eighth aspects of the present invention, even if the behavior amount falls under the under-steer characteristic, if it exceeds a predetermined under-steer determination value in the vicinity of neutral steer determination value while the behavior amount differentiated value is positive, it is determined that the steering characteristic is over-steer and even if the behavior amount falls under the over-steer characteristic, if it is below a predetermined over-steer determination value in the vicinity of neutral steer determination value while the behavior amount differentiated value is negative, it is determined that the steering characteristic is under-steer. As a result, in case of such a steering characteristic in which the steered wheel is being moved from the under-steer condition in the vicinity of the neutral steer to the over-steer condition or in case of such a steering characteristic in which the steered wheel is being moved from the over-steer condition in the vicinity of the neutral steer to the under-steer condition, such a transition tendency can be obtained early. Therefore, the starting timing of the steering control or drive power control of the vehicle can be accelerated thereby improving the behavior stability of the vehicle.

The vehicle motion control method in accordance with the more preferred teaching of the present invention, further comprising:

object control amount arithmetic operation step of computing an object control amount which is an object value for the steering control or drive power control of said vehicle;

proportional control amount arithmetic operation step of computing a proportional control amount based on a difference between said behavior amount and said object control amount; and proportional control amount zero setting step for, when said proportional control amount acts on control which intensifies the over-steer when the over-steer of said vehicle is suppressed, setting the proportional control amount to substantially zero.

The vehicle motion control method in accordance with the more preferred teaching of the present invention, further comprising:

object control amount arithmetic operation means for computing an object control amount which is an object value for the steering control or drive power control of said vehicle;

proportional control amount arithmetic operation means for computing a proportional control amount based on a difference between said behavior amount and said object control amount; and proportional control amount zero setting means for, when said proportional control amount acts on control which intensifies the over-steer when the over-steer of said vehicle is suppressed, setting the proportional control amount to substantially zero.

According to the fourth and ninth aspects of the present invention, if the proportional control amount acts on control which intensifies the over-steer when the vehicle over-steer is suppressed, the proportional control amount is set to substantially zero. Thus, even if the proportional differentiation control is carried out with the transition tendency of the steering characteristic obtained early as a trigger, the proportional control amount is set to substantially zero if the proportional control amount acts on the control which intensifies the over-steer when the vehicle over-steer is suppressed. Consequently, the intensification of the over-steer can be prevented, thereby improving the behavior stability of the vehicle further.

The vehicle motion control method in accordance with the more preferred teaching of the present invention, said steering control is carried out by transmission ratio changing control step for controlling the transmission ratio changing means which is located in the midway of steering transmission system connecting the steering wheel to the steered vehicle wheel for changing the transmission ratio by driving an electric motor.

The vehicle motion control apparatus in accordance with the more preferred teaching of the present invention, said steering control is carried out by transmission ratio changing control means for controlling the transmission ratio changing means which is located in the midway of steering transmission system connecting the steering wheel to the steered vehicle wheel for changing the transmission ratio by driving an electric motor.

According to the fifth and tenth aspects of the present invention, the steering control is carried out by transmission ratio changing control step (or transmission ratio changing control means) for controlling the transmission ratio changing means which is located in the midway of steering transmission system connecting the steering wheel to the steered vehicle wheel for changing the transmission ratio by driving an electric motor. Consequently, even if a control for intensifying the behavior stability of the vehicle is executed in so-called variable gear ratio system (hereinafter referred to as "VGRS"), spin preventing control such as counter steer control can be started at an early timing based on the tendency of the steering characteristic obtained early. Thus, not only the behavior stability of the vehicle can be improved, but also it is possible to suppress a feeling of disharmony in steering operation which can be provided to a skilled vehicle driver having a high-level driving technique. In the meantime, the VGRS is an abbreviation of variable gear ratio system, which is a registered trade mark.

DESCRIPTION OF THE PREFERRED EMBODIMENTS

Hereinafter, the embodiment of the vehicle motion control apparatus which applies the vehicle motion control method and vehicle motion control apparatus of the present invention will be described with reference to the accompanying drawings.

Figure 1:
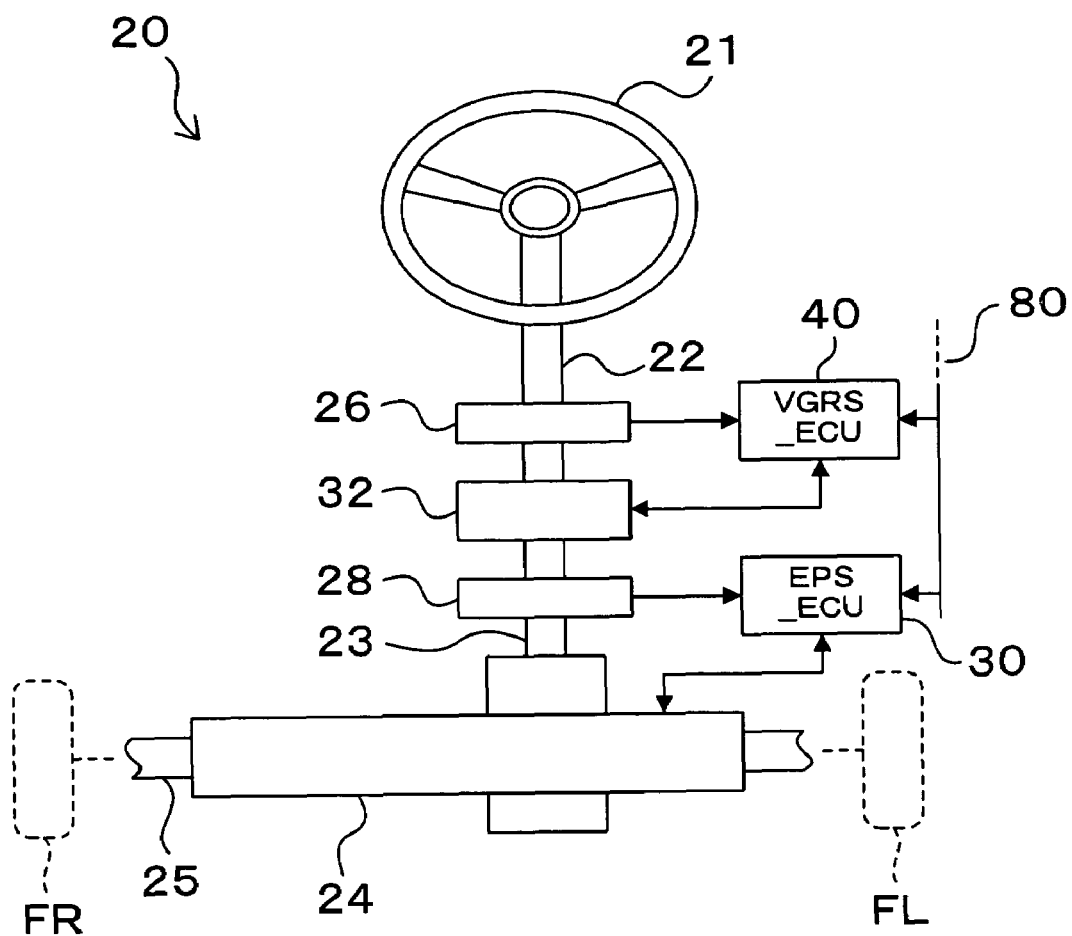
FIG. 1 is an explanatory diagram showing the outline of the structure of the vehicle motion control apparatus according to an embodiment of the present invention.

First, the mechanical structure of the vehicle motion control apparatus 20 of this embodiment will be described with reference to FIG. 1. As shown in FIG. 1, the vehicle motion control apparatus 20 comprises a steering wheel 21, a steering shaft 22, a pinion shaft 23, an EPS actuator 24, a rod 25, a steering angle sensor 26, a torque sensor 28, an EPS_ECU 30, a gear ratio changing mechanism 32, a VGRS_ECU 40 and the like.

An end of the steering shaft 22 is connected to the steering wheel 21 and an input side of the gear ratio changing mechanism 32 is connected to the other end of this steering shaft 22. An end of the pinion shaft 23 is connected to the output side of this gear ratio changing mechanism 32 while an input side of the EPS actuator 24 is connected to the other end of the pinion shaft 23.

The gear ratio changing mechanism 32 is constituted of a motor, reduction gear and the like and capable of changing the transmission ratio of I/O power by driving the motor controlled by the VGRS_ECU 40. A rotation of the steering shaft 22 inputted to the gear ratio changing mechanism 32 by driver's operation of the steering wheel 21 is outputted to the pinion shaft 23 as a rotation following the transmission ratio of the gear ratio changing mechanism 32.

The EPS actuator 24 is an electrically-driven steering apparatus, which is capable of converting a rotary motion inputted by the pinion shaft 23 to an axial direction motion of the rod 25 through a rack/pinion gear and the like (not shown) and outputting it and generating an assist force corresponding to steering condition of an assist motor controlled by the EPS_ECU 30. This rod 25 is loaded with steered wheels FR, FL. Further, this EPS actuator 24 incorporates an actual steering angle sensor for detecting the actual steering angle, which is the steering angle of the steered wheels FR, FL and data detected thereby is outputted to the EPS_ECU 30.

Although not shown in FIG. 1, the EPS_ECU 30 and VGRS_ECU 40 are information processing units each comprising a microcomputer, memory device, A/D converter, interface unit and the like, which are electronic control units (ECU). These units are connected to each other through intra-vehicle network (controller area network) 80 and are capable of receiving various kinds of detected information from vehicle wheel velocity sensors WSa-WSd, yaw rate sensor YR and the like which are described later through this intra-vehicle network 80 (see FIG. 14). In the meantime, the vehicle velocity is computed by arithmetic operation based on vehicle wheel velocity information obtained from the vehicle wheel velocity sensors WSa-WSd.

With such a structure, the gear ratio changing mechanism 32 and the VGRS_ECU 40 change the ratio of an output gear to an input gear by means of the motor and reduction gear depending on the vehicle velocity at real time so as to change the ratio of the output angle of the pinion shaft 23 to the steering angle of the steering shaft 22. Further, the EPS actuator 24 and EPS_ECU 30 generate an assist force for assisting a driver's steering operation by means of a motor depending on the driver's steering condition and vehicle velocity obtained by the vehicle torque sensor 28 and vehicle wheel velocity sensors WSa-WSd.

Next, the vehicle motion control processing by the EPS_ECU 30 and VGRS_ECU 40 of the vehicle motion control apparatus 20 will be described with reference to FIG. 2.

Figure 2:
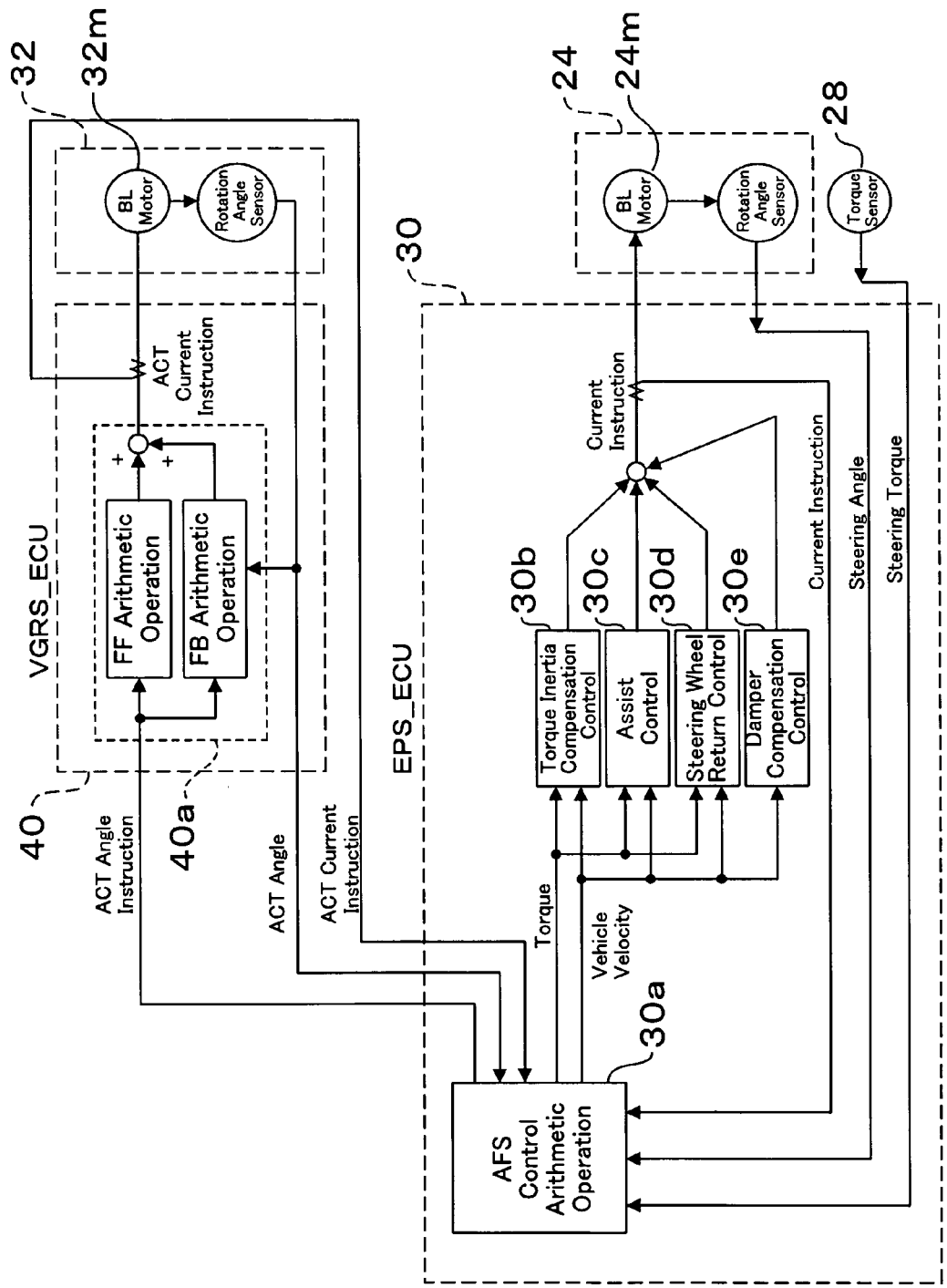
FIG. 2 is a control system block diagram showing the relation of the vehicle motion control by the EPS_ECU and VGRS_ECU in the vehicle motion control apparatus according to this embodiment.

As shown in FIG. 2, the vehicle motion control processing is carried out by the EPS_ECU 30 and VGRS_ECU 40 in the vehicle motion control apparatus 20.

In the control processing (AFS control arithmetic operation 30a, torque inertia compensation control 30b, assist control 30c, handle return control 30d, damper compensation control 30e) by the EPS_ECU 30, steering torque information and vehicle wheel velocity information obtained through the intra-vehicle network 80 and the like are inputted to the EPS_ECU 30. Consequently, a processing of determining a current instruction value of an assist motor 24m in the EPS actuator 24, which is automatically determined depending on the vehicle velocity, according to a motor current map (not shown) is carried out and a motor voltage depending on the determined current instruction value is supplied to the motor 24m through a motor drive circuit. Consequently, the EPS actuator 24 and the EPS_ECU 30 generate an assist force for assisting the driver's steering operation depending on the driver's steering condition and vehicle velocity through the assist motor 24m. In the meantime, the AFS is a system which changes the angle of the front light depending on the angle of the steering wheel 21, the AFS being abbreviation of active front light system and a registered trade mark.

The EPS_ECU 30 executes a processing of determining an ACT angle by the gear ratio changing mechanism 32 as described later, based on vehicle velocity, steering angle, yaw rate and the like and then, a processing of transferring this as an ACT angle instruction to the VGRS_ECU 40 through a shared memory possessed with the VGRS_ECU 40 or the like. After receiving the ACT angle instruction from the EPS_ECU 30, the VGRS_ECU 40 carries out a processing of supplying a motor voltage corresponding to the ACT angle instruction to the motor 32m through a motor drive circuit through the VGRS control processing 40a (feed forward (FF) arithmetic operation, feed back (FB) arithmetic operation) and carries out a processing of transferring the ACT current instruction to the motor 32m detected by the current sensor and the ACT angle which is a rotation angle of the motor 32m detected by the rotation angle sensor to the EPS_ECU 30 through the shared memory. Then, the ACT current instruction and ACT angle are used for a processing of computing the ACT angle instruction by the AFS control arithmetic operation 30a of the EPS_ECU 30. The VGRS_ECU 40 changes the ratio of the output gear to the input gear depending on the vehicle motion condition based on the vehicle velocity, steering angle, yaw rate and the like by means of the motor 32m and the reduction gear at real time so as to change the ratio of the pinion shaft 23 to the steering angle of the steering shaft 22.

In this way, the AFS control arithmetic operation 30a by the EPS_ECU 30 acquires the ACT angle instruction to be transferred to the VGRS_ECU 40 through arithmetic operation based on the yaw rate and determines the gear ratio of the gear ratio changing mechanism 32 by taking into account the steering characteristic based on the amount of the vehicle behavior generated around the axis z of the vehicle. Thus, the EPS_ECU 30 can acquire the steering characteristic (tendency of over steer and under steer) based on the amount of vehicle behavior and output an appropriate ACT angle instruction to the VGRS_ECU 40 relatively early, thereby consequently leading to improvement of the behavior stability of the vehicle by the vehicle motion control apparatus 20.

The steering characteristic determination processing of acquiring (determining) the steering characteristic early based on the amount of the vehicle behavior and the ACT angle instruction processing of outputting the ACT angle instruction to the VGRS_ECU 40 based on this steering characteristic will be described with reference to FIGS. 3-9. In the meantime, these processings are carried out by the AFS control arithmetic operation 30a of the EPS_ECU 30. Note that over steer is abbreviated as OS, under steer is abbreviated as US and neutral steer is abbreviated as NS depending on the case.

Figure 3:
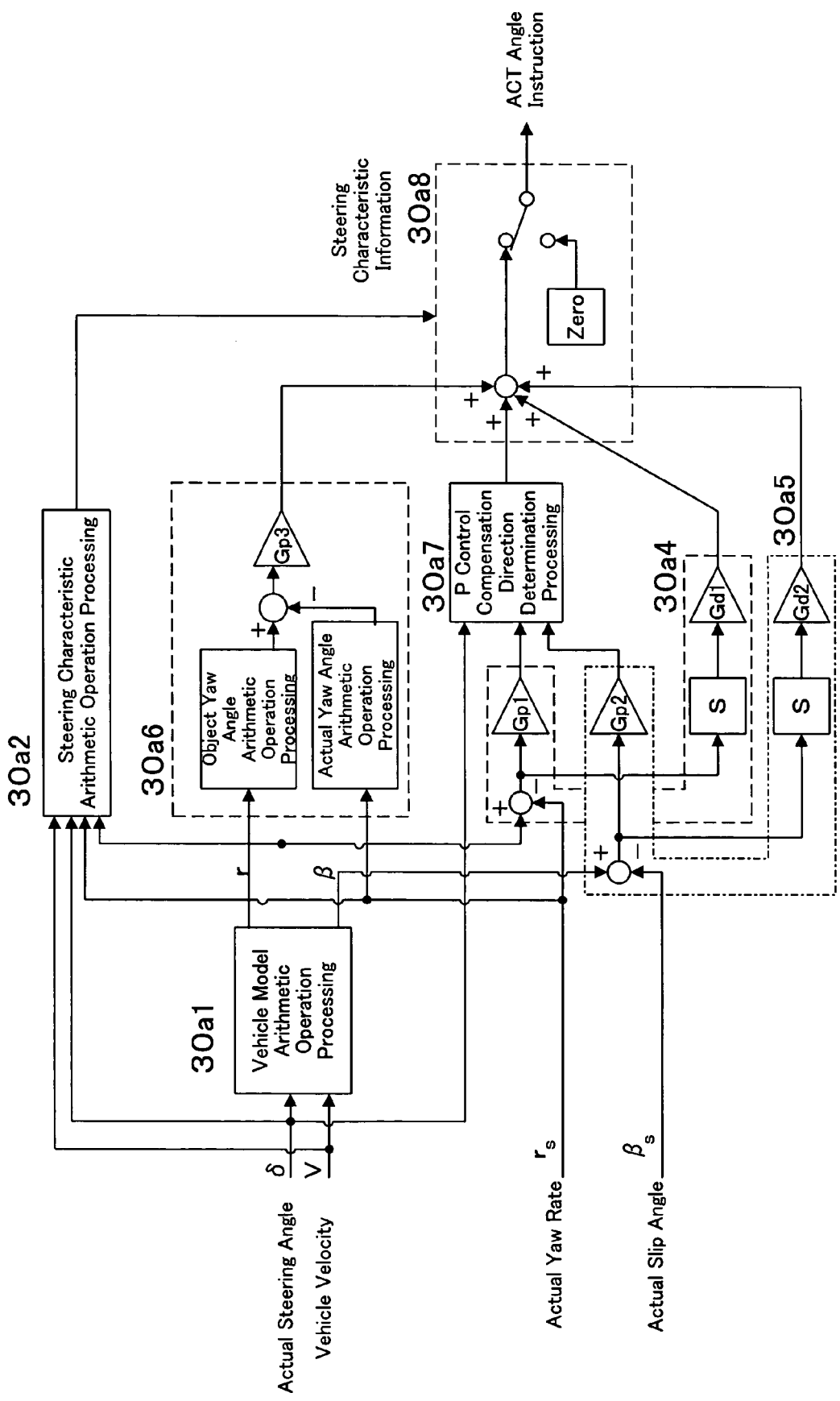
FIG. 3 is a control block diagram of control processing by AFS control arithmetic operation of the EPS_ECU shown in FIG. 2.

First the control block by the AFS control arithmetic operation 30a will be described with reference to FIG. 3. As shown in FIG. 3, the AFS control arithmetic operation 30a includes not only the processing of computing the ACT angle instruction which changes the aforementioned steering gear ratio depending on the vehicle velocity and amount of the vehicle behavior but also vehicle model arithmetic operation processing 30a1, steering characteristic arithmetic operation processing 30a2, yaw rate feedback processing 30a4, slip angle feedback processing 30a5, yaw angle feedback arithmetic operation processing 30a6, P control compensation direction determination processing 30a7 and ACT angle instruction arithmetic operation processing 30a8.

Figure 15:
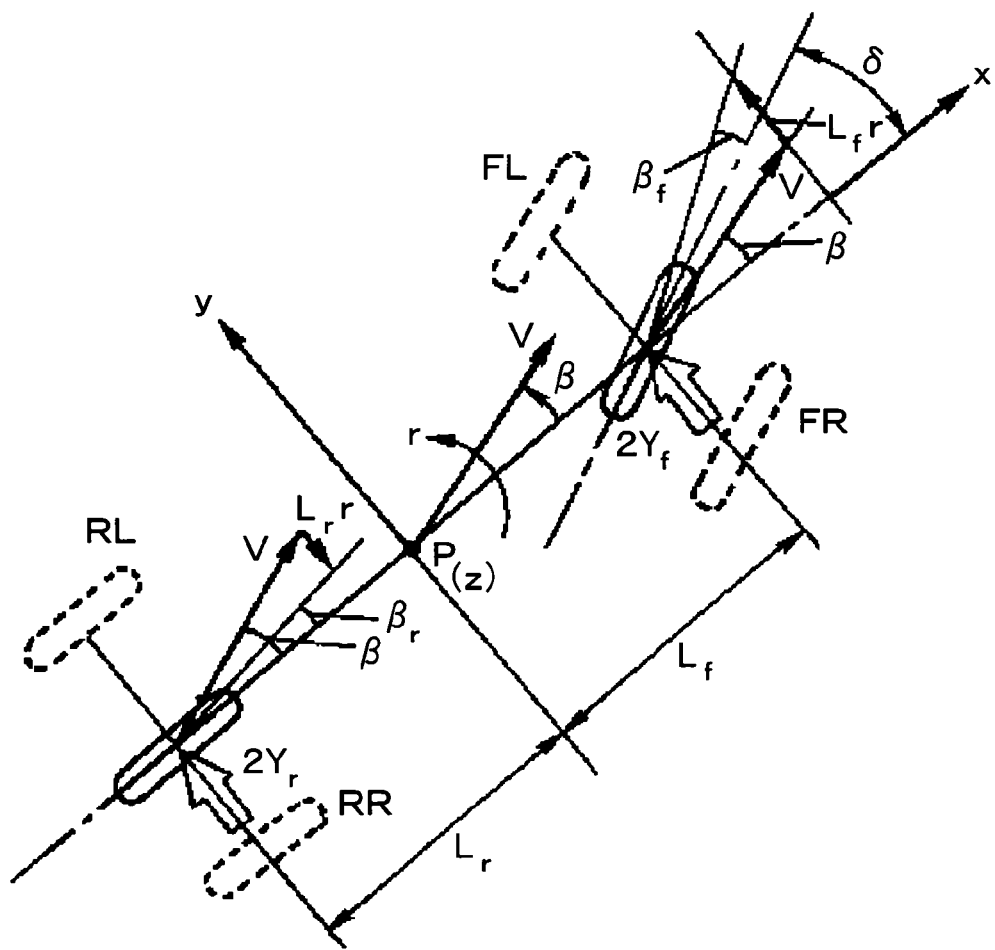
FIG. 15 is an explanatory diagram of a 2-wheel model for explaining the 2-wheel dynamic characteristic vehicle motion equation for analyzing the motion by substituting the 2-wheel vehicle for the 4-wheel vehicle.

The vehicle model arithmetic operation processing 30a1 computes an object slip angle $\beta$ and an object yaw rate r with respect to the amount of the vehicle behavior from the actual steering angle $\delta$ by an actual steering angle sensor of the EPS actuator 24 and vehicle velocity V based on the vehicle wheel velocity sensors WSa-WSd. For example, current value $\beta$ (k), r(k) are computed from a last value (k−1) of sampling time $S_t$ according to a next equation (1) based on the two-wheel model shown in FIG. 15 and an equation (3) which is a modification of the equation (2). The object slip angle $\beta$ computed by this vehicle model arithmetic operation processing 30a1 is used as a comparative reference value of the slip angle feedback processing 30a5. The object yaw rate r is used for the steering characteristic arithmetic operation processing 30a2, yaw rate feedback processing 30a4 and yaw angle feedback arithmetic operation processing 30a6.

(Expression 1)

$$mV\frac{d\beta}{dt} + 2(K_f + K_r)\beta + \left[mV + \frac{2}{V}(L_f K_f - L_r K_r)\right]r = 2K_f\delta \quad (1)$$

$$2(L_f K_f - L_r K_r)\beta + I\frac{dr}{dt} + \frac{2(L_f^2 K_f + L_r^2 K_r)}{V} = 2L_f K_f \delta \quad (2)$$

(Expression 2)

$$\begin{bmatrix}\beta(k)\\r(k)\end{bmatrix} = \left(\begin{bmatrix}1 & 0\\0 & 1\end{bmatrix} + \begin{bmatrix}0 & -1\\0 & 0\end{bmatrix}s_t \cdot v_{(k-1)} + \right. \quad (3)$$

$$\begin{bmatrix}\frac{-2(K_f + K_r)}{m} & \frac{-2(L_f K_f - L_r K_r)}{m}\\ \frac{-2(L_f K_f - L_r K_r)}{I} & \frac{-2(L_f^2 K_f + L_r^2 K_r)}{I}\end{bmatrix}$$

$$\left.\frac{s_t}{v(k-1)}\right)\begin{bmatrix}\beta(k-1)\\r(k-1)\end{bmatrix} + \begin{bmatrix}\frac{2K_f}{m}\\ \frac{2L_f K_f}{I}\end{bmatrix}s_t \cdot \delta(k-1)$$

Where m is vehicle inertial mass, V is a vehicle velocity, β is a vehicle body slip angle (vehicle gravity center slip angle), $K_f$ is a front cornering power, $K_r$ is a rear cornering power, $L_f$ is a distance between vehicle gravity center and front wheel axle, $L_r$ is a distance between vehicle gravity center and rear wheel axle, δ is an actual steering angle, I is yawing inertial moment, r is yaw rate, and $S_t$ is a sampling time. Meanwhile, β: vehicle body slip angle and r: yaw rate in the equations (1)-(3) correspond to an object slip angle β and object yaw rate r computed by the vehicle model arithmetic operation processing 30a1.

The steering characteristic arithmetic operation processing 30a2 is a processing which acquires a difference between the slip angle of the front wheels (steered wheels FR, FL) and the slip angle of the rear wheels (driven wheels RR, RL) based on the actual steering angle δ, vehicle velocity V, actual yaw rate $r_s$ or object yaw rate r or the actual steering angle δ, vehicle velocity V and object yaw rate r and determine in which condition the vehicle is in over-steer, under-steer or neutral steer condition from a result of differential computation of this difference. As the difference of the angle, more specifically, according to a case, the front wheel slip angle $\beta_f$ is acquired according to the equation (4) and the rear wheel slip angle $\beta_r$ is acquired according to the equation (5), and according to another case, front/rear wheel slip angle difference $\beta_{fr}$ is obtained according to the equation (6). Because the latter case enables the front/rear wheel slip angle difference $\beta_{fr}$ can be computed without necessity of the object slip angle β as compared to the former case, the arithmetic operation can be executed rapidly. Under the equation (6), L is a distance between the front and rear wheel axles, which is a sum of $L_f$ and $L_r$. The steering characteristic determination information which is outputted from this steering characteristic arithmetic operation processing 30a2 is inputted into the ACT angle instruction arithmetic operation processing 30a8 as trigger information.

According to the steering characteristic arithmetic operation processing 30a2 according to other example, which will be described later, a difference between the object yaw rate r and the actual yaw rate $r_s$ is acquired based on the object yaw rate r and the actual yaw rate $r_s$ and in which condition the vehicle is located in over-steer condition, under-steer condition or neutral steer condition is determined from a result of differential operation of this difference.

(Expression 3)

$$\beta_f(k) = -\beta(k) - L_f \cdot r(k)/V(k) + \delta(k) \quad (4)$$

$$\beta_r(k) = -\beta(k) + L_r \cdot r(k)/V(k) \quad (5)$$

(Expression 4)

$$\beta_{fr}(k) = L \cdot r(k)/V(k) - \delta(k) \quad (6)$$

(Expression 5)

$$F_n = (J\alpha_n + \kappa P_n)/R; (n=1, 2) \quad (7)$$

In the yaw rate feedback processing 30a4, a processing for acquiring a differential possessed by the actual yaw rate $r_s$ detected by the yaw rate sensor YR with respect to an object yaw rate r computed by the vehicle model arithmetic operation processing 30a1 and providing it with a predetermined control gain Gp1 and a processing for differentiating that differential and providing with the predetermined control gain Gd1 are carried out. Then, a proportional control amount (compensation amount) by yaw rate is outputted to the P control compensation direction determination processing 30a7. Then, a PD (proportional differentiate) control amount whose phase is quickened by the differentiation is outputted to the ACT angle instruction arithmetic operation processing 30a8.

In the slip angle feedback processing 30a5, a processing for obtaining a differential possessed by the actual slip angle (front wheel lateral slip angle) $\beta_s$ stored by the shared memory with respect to an object slip angle β computed by the vehicle model arithmetic operation processing 30a1 and providing with a predetermined control gain Gp2 and a processing for differentiating that differential and providing with the predetermined control gain Gd2 are carried out. Consequently, a proportional control amount (compensation amount) by the slip angle is outputted to the P control compensation direction determination processing 30a7 and the proportional differentiation (PD) control amount whose phase is quickened by differentiation is outputted to the ACT angle instruction arithmetic operation processing 30a8.

The yaw angle feedback arithmetic operation processing 30a6 is a processing for computing a yaw angle which should be proportionally controlled as an ACT angle instruction based on an object yaw rate r inputted from the vehicle model arithmetic operation processing 30a1 and an actual yaw rate $r_s$ inputted from the yaw rate sensor YR. More specifically, the object yaw rate is acquired by integrating the object yaw rates r and then, the actual yaw rate is acquired by integrating the actual yaw rates $r_s$. Then, by acquiring a differential of the actual yaw angle to the object yaw angle and providing with a predetermined control gain Gp3, the proportional control amount of the yaw angle is computed and outputted to the ACT angle instruction arithmetic operation processing 30a8.

In the P control compensation direction determination processing 30a7, whether or not the proportional control compensation based on the yaw rate should be carried out is determined based on the proportional control amount (compensation amount) of the yaw rate inputted from the yaw rate feedback processing 30a4 and an actual steering angle δ and if the proportional control compensation acts in a direction which enhances the over steer of the vehicle, the proportional control compensation amount based on the yaw rate and the proportional control compensation amount based on the slip angle are set to zero.

In the ACT angle instruction arithmetic operation processing 30a8, the PD control amount of the yaw rate inputted from the yaw rate feedback processing 30a4, the PD control amount of the slip angle inputted from the slip angle feedback processing 30a5, the proportional control amount of the yaw angle inputted from the yaw angle feedback arithmetic operation processing 30a6 and the proportional control compensation amount inputted from the P control compensation direction determination processing 30a7 are summed up so as to compute the ACT angle instruction value. If the steering characteristic is over steer, the ACT angle instruction value which is a result of the summing is outputted based on the steering characteristic determination information inputted from the steering characteristic arithmetic operation processing 30a2.

Next, the flow of the respective processings will be described with reference to a flow chart shown in FIG. 4. This processing is executed by the AFS control arithmetic operation 30a by the EPS_ECU 30 and for example, executed repeatedly and periodically (for example, every 5 milliseconds) by timer interruption or the like.

Figure 4:
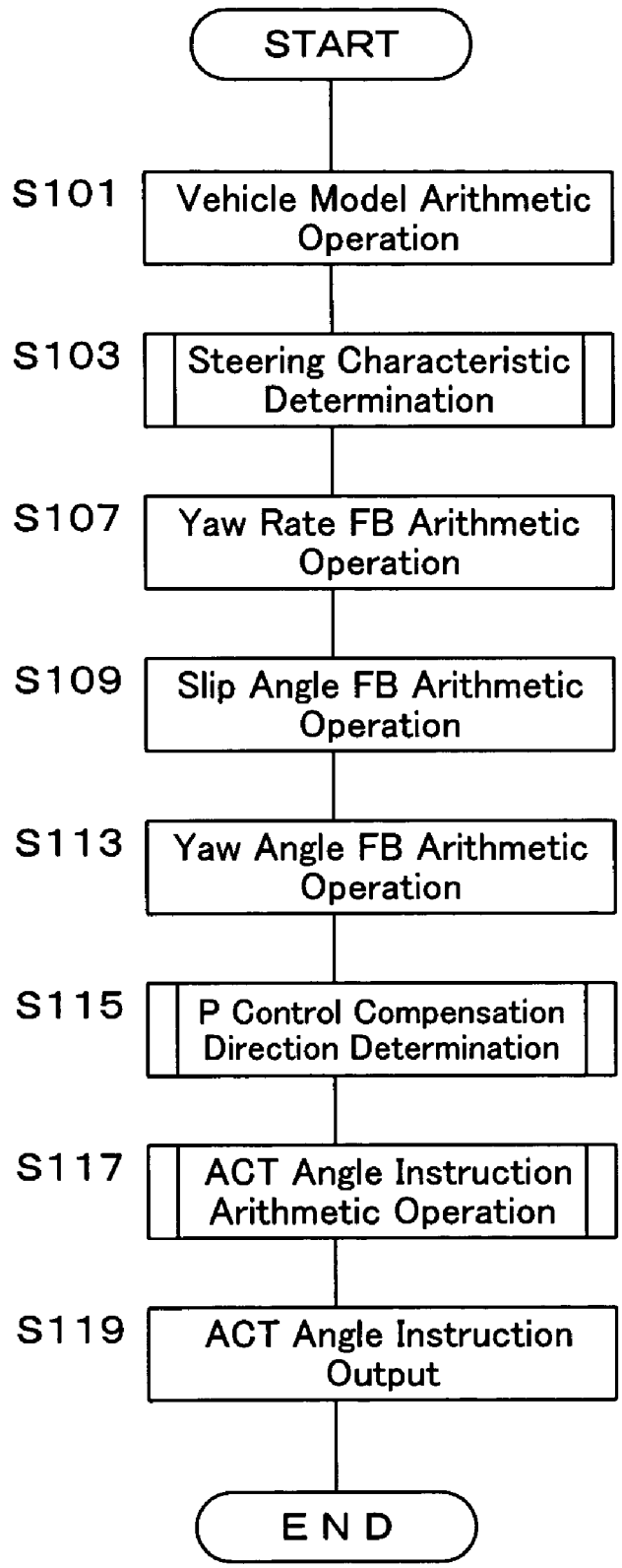
FIG. 4 is a flow chart showing the flow of the ACT angle instruction processing which is controlled by the AFS control arithmetic operation of the EPS_ECU shown in FIG. 2.

As shown in FIG. 4, in the ACT angle instruction processing, the vehicle model arithmetic operation processing is carried out in step S101. This processing is carried out by the vehicle model arithmetic operation processing 30a1 described previously, in which the object slip angle β and the object yaw rate r are computed based on the actual steering angle δ and the vehicle velocity V. In the meantime, the processing in this step S101 may correspond to "behavior amount acquiring step, object control amount arithmetic operation step" described in the scope for patent in "CLAIMS".

Figure 5:
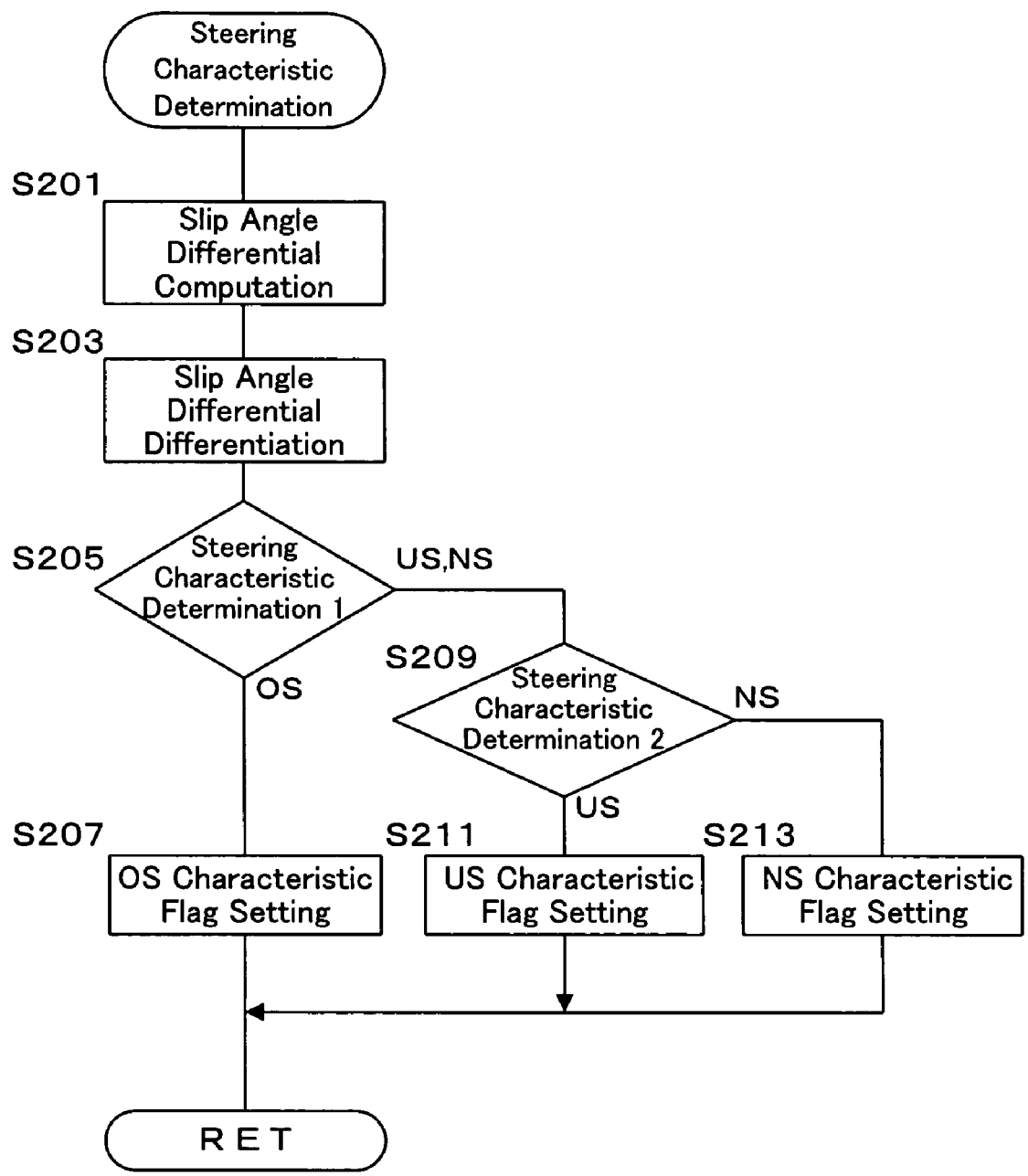
FIG. 5 is a flow chart showing the steering characteristic determination processing shown in FIG. 4.

Next, the steering characteristic determination processing is carried out in step S103. This processing is executed by the steering characteristic arithmetic operation processing 30a2 and the detail of that processing is shown in FIG. 5. Thus, the steering characteristic determination processing by the steering characteristic arithmetic operation processing 30a2 will be described with reference to FIG. 5.

As shown in FIG. 5, in the steering characteristic determination processing, the slip angle differential computation is carried out in step S201. This arithmetic operation processing is for computing a difference between the front wheel (steered wheels FR, FL) slip angle $\beta_f$ and the rear wheel (driven wheels RR,RL) slip angle $\beta_r$, that is, the slip angle differential $\beta_{fr}$. For example, such slip angle differential value $\beta_{fr}$ is computed according to the above described equation (6). In the meantime, the processing of this step S201 may correspond to the "behavior amount acquiring step" described in scope for patent in "CLAIMS".

In subsequent step S203, the slip angle differential differentiation is carried out. This processing is executed to differentiate the slip angle differential value $\beta_{fr}$ acquired in step S201. Because this differentiation can advance the phase of the slip angle differential $\beta_{fr}$, the transition tendency of the steering characteristic can be determined early based on the steering characteristic determinations in steps S205, S209. In the meantime, the processing of this step S203 may correspond to "differentiation step" described in scope for patent in "CLAIMS".

The steering characteristic determination 1 is carried out in next step S205. That is, whether or not the steering characteristic is over steer is determined based on the slip angle differential acquired in step S201 and the differentiated value of the slip angle differential acquired in step S203. In the meantime, the processing of this step S205 may correspond to "steering characteristic determination step, over steer characteristic determination step" described in scope for patent in "CLAIMS".

More specifically, because the slip angle differential is a remainder gained by subtracting the front wheel slip angle $\beta_f$ from the rear wheel slip angle $\beta_r$, whether or not over-steer arises is determined by determining whether or not the slip angle differential value exceeds a predetermined OS threshold (for example, +0.05 rad). If the slip angle differential value exceeds the predetermined weak US threshold (for example, −0.02 rad) and the differentiated value of the slip angle differential is positive (over zero) even when it is determined that no over-steer arises in the above determination, it is determined that the over-steer arises. If this determination condition is expressed in a logical expression, it is expressed as (slip angle differential value>OS threshold) or (slip angle differential>weak US threshold and differential differentiated value>0).

If it is determined that the steering characteristic is over-steer in this step S205 (OS in step S205), a processing for setting the over-steer characteristic flag in a flag region of the shared memory or the like is carried out in subsequent step S207 and then, this steering characteristic determination processing is terminated. On the other hand, unless it is determined that the steering characteristic is over-steer (US, NS in step S205), the steering characteristic determination 2 is carried out in step S209.

Although whether or not over-steer arises in the "steering characteristic determination 1" in step S205, whether or not under-steer arises is determined in the "steering characteristic determination 2" in step S209. Namely, in this step S209, whether or not the steering characteristic is under-steer is determined based on the slip angle differential and slip angle differential differentiated value. This processing of step S209 may correspond to "steering characteristic determination step, under-steering characteristic determination steps" described in scope for patent in "CLAIMS".

More specifically, whether or not under-steer arises is determined by determining whether or not the slip angle differential value is below a predetermined US threshold (for example, −0.05 rad). Even if it is determined that under-steer does not arise in this determination, if it is determined that the slip angle differential value is below a predetermined weak OS threshold (for example, +0.02 rad) and the differentiated value of the slip angle differential is negative (below zero), it is determined that under-steer arises. If this determination condition is expressed in a logical expression, it is expressed as (slip angle differential value<US threshold) or (slip angle differential value<weak OS threshold and differential differentiated value<0).

If it is determined that the steering characteristic is under-steer in this step S209 (US in step S209), a processing for setting the under-steer characteristic flag in a flag region of the shared memory or the like is carried out in subsequent step S211 and then, this steering characteristic determination processing is terminated. On the other hand, unless it is determined that the steering characteristic is under-steer in step S209 (NS in step S209), it is determined that the steering characteristic is not over-steer nor under-steer but neutral steer and therefore, the processing proceeds to step S213.

In step S213, a processing for setting the neutral steer characteristic flag in a flag region of the shared memory or the like is carried out like steps S207, S211 and if this steer characteristic determination processing is terminated, the processing proceeds to the yaw rate feedback arithmetic operation processing in step S107 shown in FIG. 4.

Returning to FIG. 4, the yaw rate feedback arithmetic operation processing is carried out in step S107. This processing is executed through the above-described yaw rate feedback processing 30a4, in which a difference (proportional control amount) of the actual yaw rate $r_s$ with respect to the object yaw rate r computed in step S101 is obtained and this is regarded as a yaw rate P control compensation amount. The processing of this step S107 may correspond to the "proportional control amount arithmetic operation step" described in scope for patent in "CLAIMS".

The slip angle feedback arithmetic operation processing is carried out in next step S109. This processing is executed through the above-described slip angle feedback processing 30a5, in which a difference (proportional control amount) of the actual slip angle $\beta_s$ with respect to the object slip angle $\beta$ computed in step S101 is acquired and this is regarded as a slip angle P control compensation amount. In the meantime, the processing of this step S109 may correspond to the "proportional control amount arithmetic operation step" described in scope for patent in "CLAIMS".

The yaw angle feedback arithmetic operation processing is carried out in subsequent step S113. This processing is executed through the above-described yaw angle feedback arithmetic operation processing 30a6.

Figure 6:
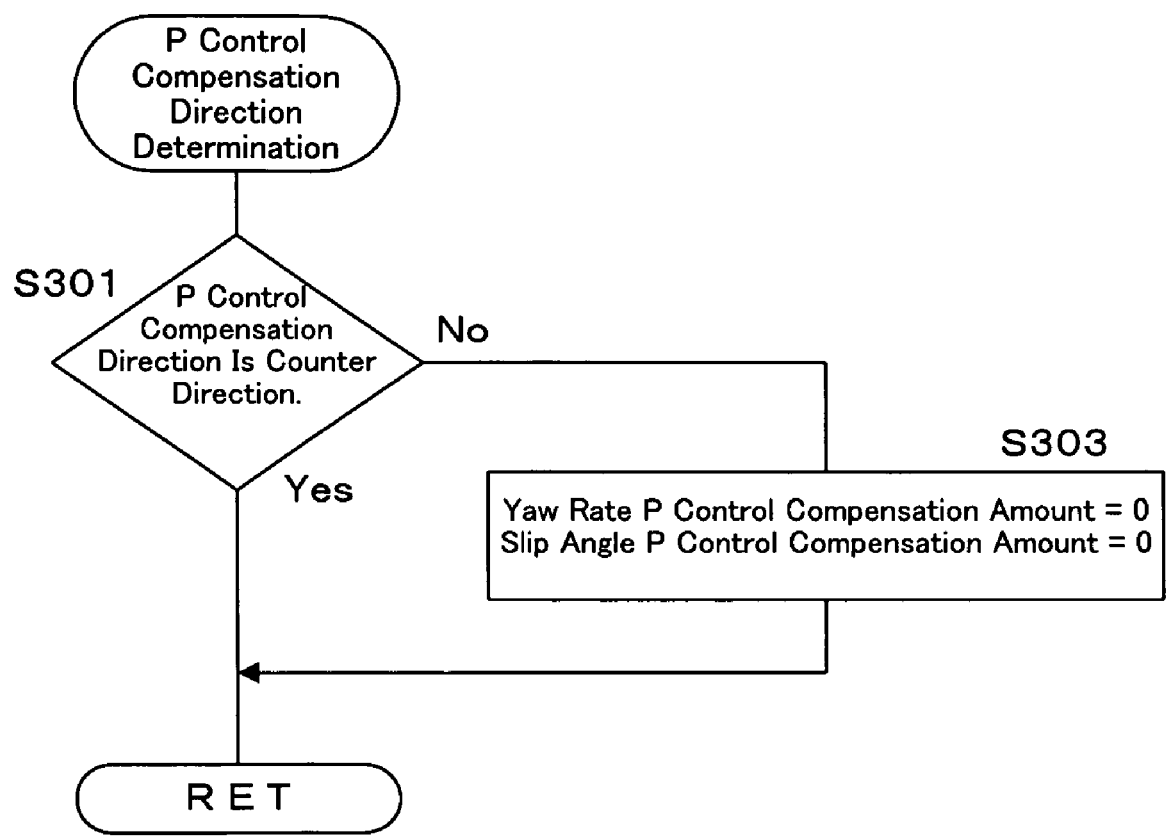
FIG. 6 is a flow chart showing the P control compensation direction determination processing shown in FIG. 4.

The P control compensation direction determination processing is carried out in step S115. This processing is executed through the P control compensation direction determination processing 30a7 and the detail of that processing is indicated in FIG. 6. Thus, the P control compensation direction determination processing by the P control compensation direction determination processing 30a7 will be described with reference to FIG. 6. In the meantime, the step S115 may correspond to the "proportional control amount zero setting step" described in scope for patent in "CLAIMS".

In the P control compensation direction determination processing, as shown in FIG. 6, whether or not the P compensation direction is a counter direction is determined in step S301. That is, whether or not the proportional control amount which is a difference computed in step S107 is applied in a direction not increasing the over-steer of a vehicle (counter direction) is determined.

More specifically, if the sign of the steering direction (actual steering angle δ) and the sign of the yaw rate proportional control compensation direction are different from each other (for example, in case of over-steer characteristic, steering direction is a turning-back direction), it is determined that the compensation direction of the proportional control is a counter direction (Yes in S301) and then, the P control compensation direction determination processing is terminated. Then, the processing proceeds to the ACT angle instruction arithmetic operation processing in step S117. That is, because the proportional control acts to improve the behavior stability of the vehicle, a processing for outputting it as it is carried out.

On the other hand, if the sign of the steering direction (actual steering angles) and the sign of the yaw rate proportional control compensation direction are the same (for example, in case of over-steer characteristic, the steering direction is a further turning direction), it is determined that the compensation direction of the proportional control is not a counter direction (No in S301) and the proportional control amount is applied in a direction which increases the over-steer of the vehicle (opposite direction to the counter direction). Thus, the processing proceeds to step S303 in order to restrict the proportional control.

In step S303, a processing for setting the yaw rate proportional control compensation amount (proportional control amount) and the slip angle proportional control compensation amount (proportional control amount) to zero or near zero (substantially zero) is carried out. As a result, even if the proportional control amount such as the yaw rate proportional control compensation amount or the slip angle proportional control compensation amount is applied in a direction which increases the over-steer of the vehicle (opposite direction to the counter direction), an increase in the over-steer can be prevented because this processing sets each control amount to zero or near zero, thereby improving the behavior stability of the vehicle.

In the meantime, steps S301, S303 may correspond to the "proportional control amount zero setting step" described in scope for patent in "CLAIMS".

Figure 7:
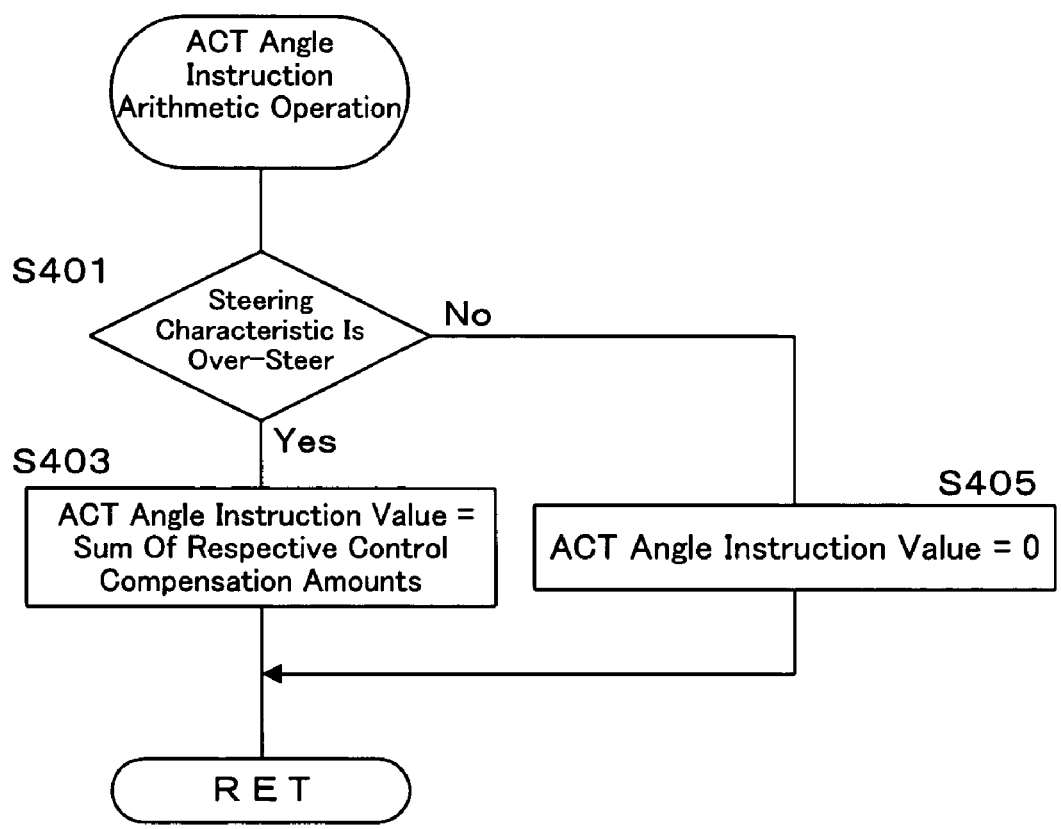
FIG. 7 is a flow chart showing the ACT angle instruction arithmetic operation processing shown in FIG. 4.
Figure 8:
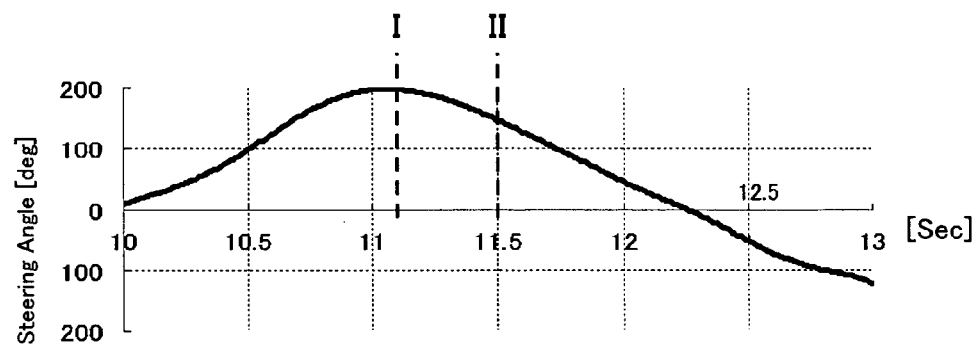
FIG. 8(A) is a characteristic diagram showing changes in steering angle with respect to time when the steering characteristic determination processing shown in FIG. 5 is executed.
FIG. 8(B) is a characteristic diagram showing changes in steering characteristic value and the like at the time of over-steer and FIG. 8(C) is a characteristic diagram showing changes in steering characteristic value and the like at the time of under-steer.
Figure 8:
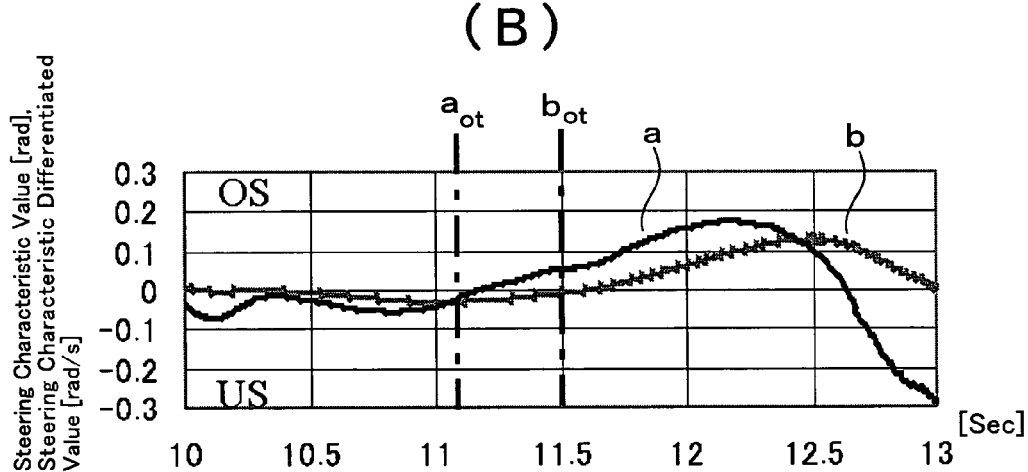
Figure 8:
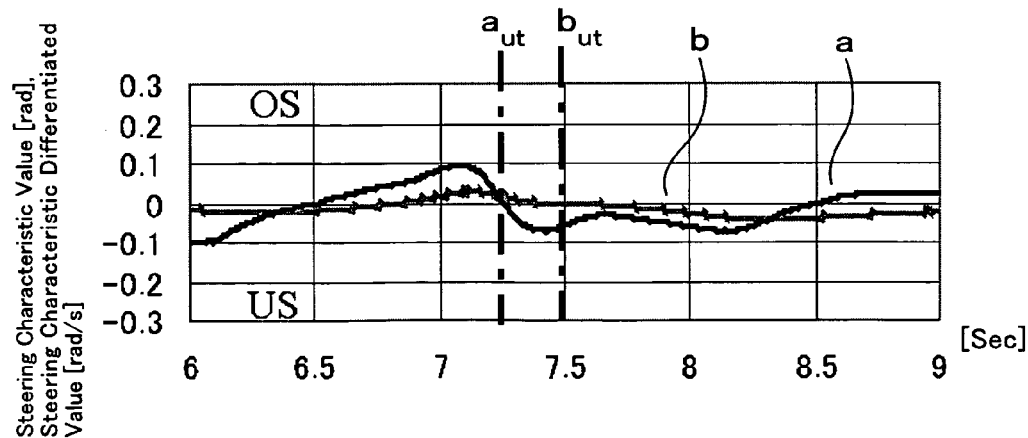

Returning to FIG. 4 again, the ACT angle instruction arithmetic operation processing is carried out in step S117. This processing is executed through the above-described ACT angle instruction arithmetic operation processing 30a8 and the detail of this processing is shown in FIG. 7. Thus, the ACT angle instruction arithmetic operation processing by the ACT angle instruction arithmetic operation processing 30a8 will be described with reference to FIG. 7. In the meantime, step S117 may correspond to the "transmission ratio changing control step" described in the scope for patent in "CLAIMS".

As shown in FIG. 7, in the ACT angle instruction arithmetic operation processing, whether or not the steering characteristic (steering characteristic information) determined in step S103 is over-steer is determined in step S401. That is, if it is determined that the over-steer characteristic flag is posted in step S103, it is determined that the steering characteristic of the vehicle is over-steer (Yes in S401) and then, the processing proceeds to step 403. On the other hand, if it is determined that no over-steer characteristic flag is posted in step S103, it is determined that the steering characteristic of the vehicle is not over-steer (No in S401) and the processing proceeds to step S405. Meanwhile, this processing is expressed with the symbols of switches in the ACT angle instruction arithmetic operation processing 30a8 in FIG. 3.

Step S403 is executed if the steering characteristic of the vehicle is over-steer (Yes in step S401), so that a processing for converting a sum of respective control compensation amounts computed in each step to an ACT angle instruction value is carried out. That is, proportional differentiation (PD) control amount of the yaw rate computed in step S107, proportional differentiation (PD) control amount of the slip angle computed in step S109, the proportional control amount of the yaw angle computed in step S113, the yaw rate proportional control compensation amount set up in S115 and the slip angle proportional control compensation amount are summed up so as to compute the ACT angle instruction value.

On the other hand, step S405 is executed if the steering characteristic of the vehicle is not over-steer (No in step S401), a processing for setting the ACT angle instruction value to zero or near zero (substantially zero) regardless of the respective control compensation amounts computed in each step is carried out.

The processing of this step S405 is not limited to this example. For example, it is permissible to determine whether or not the steering characteristic is under-steer and if the steering characteristic is under-steer, set the ACT angle instruction value to a control compensation amount suitable for the under-steer characteristic and if it is not under-steer, set the ACT angle instruction value to a control compensation amount suitable for the neutral-steer characteristic. Consequently, the behavior stability of the vehicle is improved.

If the processing of step S403 or S405 is terminated, the processing is returned to the ACT angle instruction processing shown in FIG. 4 and the ACT angle instruction output processing by step S119 is carried out. Then, a processing for transferring the ACT angle instruction to the VGRS_ECU 40 through the shared memory or the like possessed with the VGRS_ECU 40 is carried out. Consequently, the ACT angle instruction is outputted from the AFS control arithmetic operation 30a by the EPS_ECU 30 to the VGRS control processing 40a by the VGRS_ECU 40 as shown in FIG. 2. Because a series of the ACT angle instruction processing is terminated when the ACT angle instruction output processing by step S403 is terminated, the processing waits for a next processing opportunity by the timer interruption or the like.

For the steering characteristic determination processing of step S103, by executing the ACT angle instruction processing shown in FIG. 4, a slip angle differential value is computed directly according to the expression (6) in step S201 shown in FIG. 5 and further, this slip angle differential value is differentiated in step S203.

As a result, as shown in steering angle characteristic shown in FIG. 8(A), if a vehicle accelerates and swivels on a low μ road, the rear section (driven wheels RR, RL) of the vehicle starts to slip sideway from the swivel center toward outside in the vicinity of about 11.1 seconds and therefore, the over-steer condition can be reached. After that, the steering angle is changed in the turning-back direction by a subsequent driver's counter steering operation. That is, it can be understood that the steering characteristic is moved to a steering for avoiding the over-steer condition from this steering angle characteristic.

FIG. 8(B) shows changes in the steering characteristic value or steering characteristic differentiated value at the time of over-steer (a symbol a and a symbol b in FIG. 8(B) indicate steering characteristic differentiated value and steering characteristic value respectively). This figure indicates that if the steering characteristic value is over 0 rad in the ordinate axis direction, over-steer condition arises, if it is below 0 rad, under-steer condition arises and if it is 0 rad, neutral steer condition arises (the same thing can be said in FIG. 8(C))

Under the steering characteristic differentiated value a which is obtained as a result of differentiation (S203), the transition tendency of the steering characteristic, that is, in which way the motion condition of the vehicle is moved to over-steer or under-steer can be obtained early through the steering characteristic determination processing shown in FIG. 5 as described above. Thus, from the transition tendency to the over-steer in a period before the over-steer condition is reached, it is determined that the steering characteristic is over-steer (S205) and then the ACT angle instruction arithmetic operation (S117) is carried out. Thus, control on the gear ratio changing mechanism 32 by the VGRS_ECU 40 to the over-steer condition can be started at a timing of a sign I (about 11.1 seconds) shown in FIG. 8(A) (control startup timing $a_{ot}$ shown in FIG. 8(B)).

Contrary to this, under the steering characteristic value b not subjected to the differentiation, the transition tendency of the steering characteristic cannot be obtained early and thus, after over-steer condition is reached, proportional control based on a difference due to it is carried out. For the reason, it is evident that as shown in FIG. 8(B), control start timing $b_{ot}$ at the time of transition to over-steer is about 11.5 seconds, which is about 0.4 seconds later than the control start timing $a_{ot}$ of the present invention (timing of a sign II shown in FIG. 8(A)).

The delay of the control start timing occurs in case of the under-steer condition also. As for changes in the steering characteristic value or steering characteristic differentiated value at the time of under-steering shown in FIG. 8(C), apparently, the control start timing $b_{ut}$ (about 7.5 seconds) is later by about 0.25 seconds than the control start timing $a_{ut}$ (about 7.25 seconds) by the steering characteristic differentiated value a of this embodiment. The steering angle characteristic shown in FIG. 8(A) is an extraction of the characteristic obtained when the vehicle accelerates and swivels on the low μ road and a steering angle characteristic (one corresponding to FIG. 8(A)) indicating a state before and after the under-steer condition shown in FIG. 8(C) is not indicated here.

If the control start timing $a_{ot}$ at the time of transition to the over-steer is accelerated, the yaw rate P control compensation amount can be outputted so as to compensate toward a further turning direction by the above-described step S107 (FIG. 4) halfway of the transition from the under-steer condition to the over-steer condition. As for the yaw rate P control compensation amount $a_{YP}$ shown in FIG. 9(C), the yaw rate P control compensation amount $a_{YP}$ can be outputted in an opposite direction to the counter direction even if the over-steer condition arises at the control start timing $a_{ot}$ (compensation amount $a'_{YP}$ in a shaded section (positive) of FIG. 9(C)).

Thus, in the ACT angle instruction processing of this embodiment, if the P control compensation direction is not a counter direction as a result of the P control compensation direction determination processing of step S115 (No in S301), the yaw rate P control compensation amount and the slip angle P control compensation amount are set to zero or the like so as to deprive a compensation amount $a'_{YP}$ which is the shaded portion shown in FIG. 9(C) (S303). When the yaw rate P control compensation amount which is a proportional control amount acts for control which increases the over-steer of the vehicle, the yaw rate P control compensation amount $a_{YP}$ is set to substantially zero (flatness characteristic section $a''_{YP}$ shown in FIG. 9(C)). Then, while this is being set to zero or the like, the vehicle is controlled by the yaw rate D control compensation amount $a_{YD}$. Consequently, the compensation amount $a_{YP}$ by the item P and the compensation amount $a_{YD}$ by the item D turn into opposite signs thereby preventing the respective compensation amounts from canceling each other. Thus, like the ACT angle instruction value shown in FIG. 9(D), an ACT angle instruction value $a_{ACT}$ which acts in a counter direction to the over-steer condition even in a period Δt from a control start timing $a_{ot}$ can be outputted.

Figure 9:
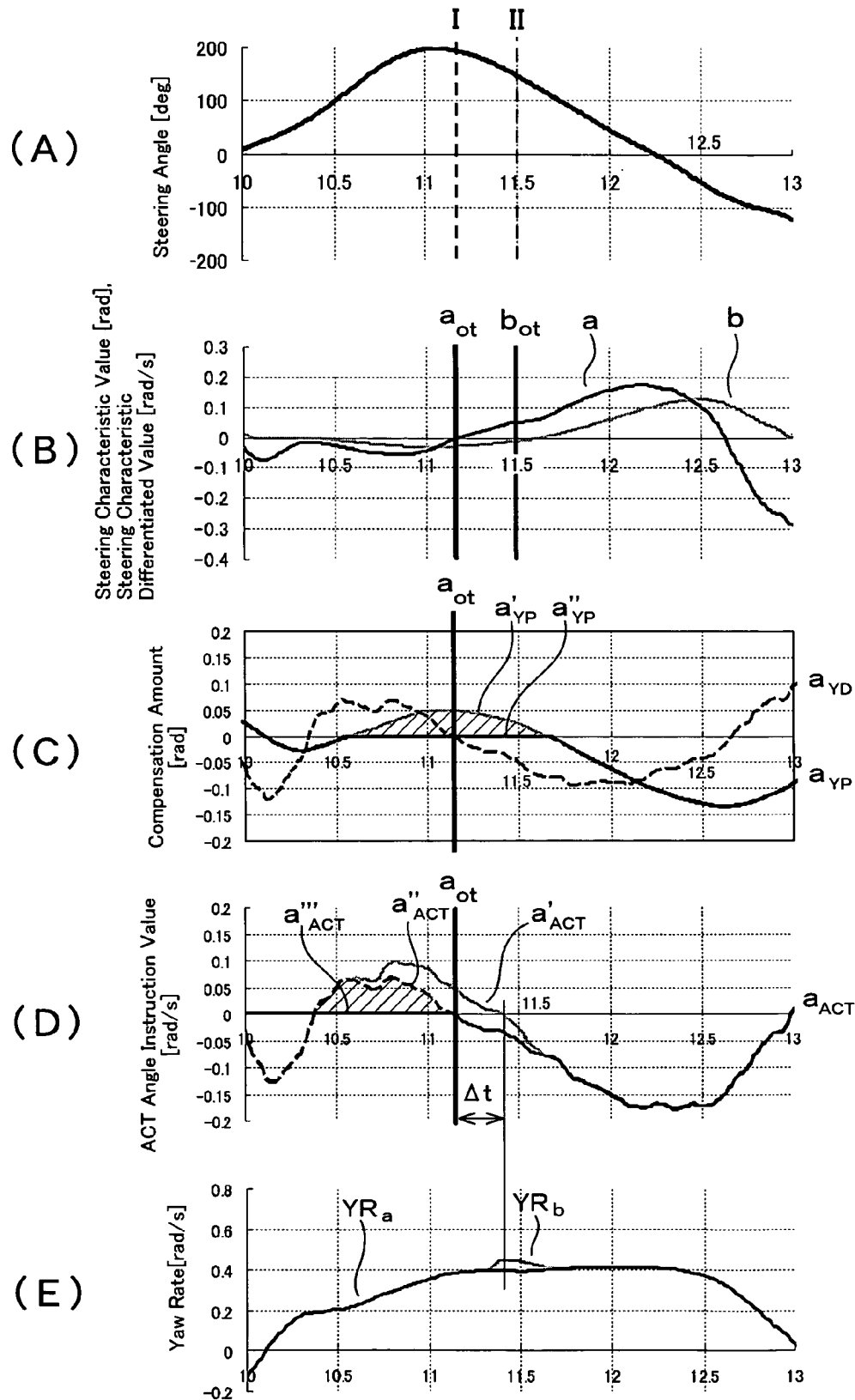
FIG. 9(A) is a characteristic diagram showing the steering angle.
FIG. 9(B) is a characteristic diagram showing steering characteristic value and the like, FIG. 9(C) is a characteristic diagram showing yaw rate P control compensation amount and the like, FIG. 9(D) is a characteristic diagram showing ACT angle instruction value
FIG. 9(E) is a characteristic diagram showing the yaw rate.

Contrary to this, if the P control compensation direction determination processing (S115) does not exist, the compensation amount $a'_{YP}$ which is the shaded section shown in FIG. 9(C) becomes effective as a factor which cancels the compensation amount $a_{YD}$ by the item D. Thus, the ACT angle instruction value $a'_{ACT}$ which acts in a direction which increases the over-steer is outputted in the period Δt shown in FIG. 9(D), thereby compensating in the direction which intensifies the steering of wheels. In the meantime, FIG. 9(A) is the same as the characteristic diagram of the steering angle shown in FIG. 8(A) and FIG. 9(B) is the same as the characteristic diagram of steering characteristic value or steering characteristic differentiated value shown in FIG. 8(B). These figures are indicated as sub-diagrams of FIG. 9 in order to clarify the relation with respective characteristic and steering angle characteristic and the like shown in FIGS. 9(C)-(E) from viewpoint of time series.

Further, in the ACT angle instruction processing of this embodiment, as long as the over-steer characteristic is not recognized in step S103 (Yes in S401), the ACT angle instruction value is set to zero or the like in order to improve the behavior stability of the vehicle in order to deprive the ACT angle instruction value $a''_{ACT}$ which is the shaded section shown in FIG. 9(D) (S405). That is, when the ACT angle instruction value which is a steering control compensation instruction value acts for control which intensifies the over-steer of the vehicle, the ACT angle instruction value $a_{ACT}$ is set to substantially zero (flatness characteristic section $a'''_{ACT}$ shown in FIG. 9(D)). As a result, even if the yaw rate P control compensation amount $a_{YP}$ acts for control which intensifies the over-steer of the vehicle as shown in FIG. 9(C), the output of the ACT angle instruction value like the ACT angle instruction value $a''_{ACT}$ shown in FIG. 9(D) can be suppressed.

The ACT angle instruction is outputted to the VGRS_ECU 40 in step S119 so as to control the gear ratio changing mechanism 32 and therefore, if the behavior stability of the vehicle is measured as the actual yaw rate by the yaw rate sensor YS, a yaw rate characteristic YRa as shown in FIG. 9(E) can be obtained. Consequently, it becomes evident that the behavior stability of the vehicle is improved after the period of Δt is elapsed since the control start timing $a_{ot}$ as compared to the yaw rate characteristic YRb in case where the control start timing $b_{ot}$ shown in FIG. 9(B) is slow.

Other example of the steering characteristic determination processing in step S103 shown in FIG. 4 will be described with reference to FIGS. 3, 10, 11. In the meantime, the steering characteristic determination processing shown in FIG. 10 is executed through the steering characteristic arithmetic operation processing 30a2 in the AFS control arithmetic operation 30a by the EPS_ECU 30 like the steering characteristic determination processing shown in FIG. 5.

Figure 10:
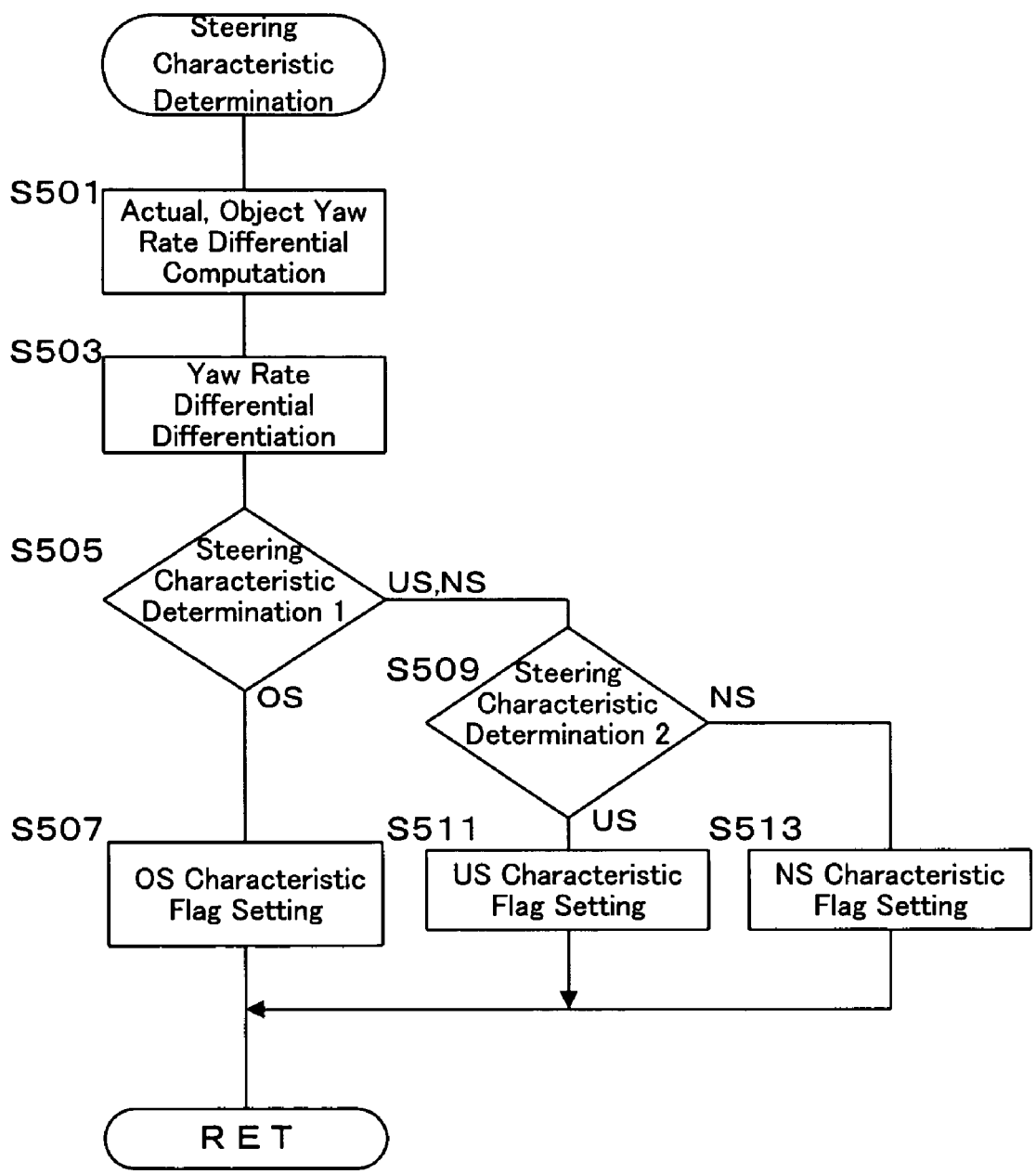
FIG. 10 is a flow chart showing a first example of the steering characteristic determination processing shown in FIG. 5.

According to the other example of the steering characteristic determination processing as shown in FIG. 10, a processing for computing a difference between the actual yaw rate $r_s$ and the object yaw rate r is carried out in step S501. This processing is for computing the difference $(r-r_s)$ between the object yaw rate r obtained by the expression (3) and the actual yaw rate $r_s$ by the yaw rate sensor YS as a behavior amount of the vehicle. If this is expressed as a creation of technical philosophy, the behavior amount described in the scope for patent in "CLAIMS" can be expressed as "a difference between the object yaw rate which is an object value of vehicle steering control or drive control and the actual yaw rate which occurs in the vehicle" otherwise. In the meantime, the processing of this step S501 may correspond to "behavior amount acquiring step" described in the scope for patent in "CLAIMS".

In next step S503, a processing for differentiating the yaw rate differential value $(r-r_s)$ obtained in step S501 is carried out. Because the phase of the yaw rate differential value can be advanced by this differentiation, the transition tendency of the steering characteristic can be determined early by the steering characteristic determination in next step S505 or S509. The processing of this step S503 may correspond to "differentiation step" described in the scope for patent in "CLAIMS".

The subsequent steps S505, S507, S509, S511, S513 correspond to steps S205, S207, S209, S211, S213 contained in the steering characteristic determination processing shown in FIG. 5 and they are the same except that the slip angle differential is replaced with the yaw rate differential value. Therefore, detailed description is omitted.

The determination conditional expression in the steering characteristic determination 1 in step S505 is (yaw rate differential value>OS threshold) or (yaw rate differential value>weak US threshold and differential differentiated value >0). Further, the determination conditional expression in the steering characteristic determination 2 in step S509 is (yaw rate differential value<US threshold) or (yaw rate differential value<weak OS threshold and differential differentiated value <0). Further, the processing in step S505 may correspond to "steering characteristic determination step, over-steer characteristic determination step" described in the scope for patent in "CLAIMS" and the processing of step S509 may correspond to "steering characteristic determination step, under-steer characteristic determination step" described in the scope for patent in "CLAIMS".

Figure 11:
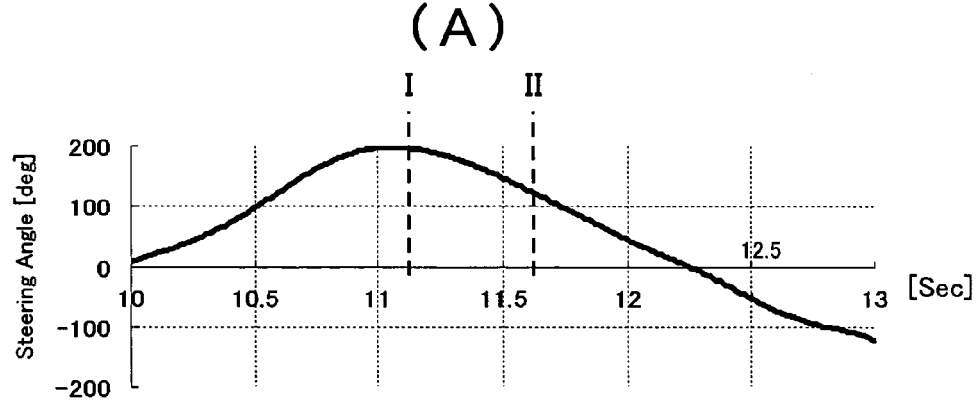
FIG. 11(A) is a characteristic diagram showing changes in the steering angle with respect to time when the steering characteristic determination processing shown in FIG. 10 is executed.
FIG. 11(B) is a characteristic diagram showing changes in the steering characteristic value and the like at the time of over-steer and FIG. 11(C) is a characteristic diagram showing the steering characteristic value and the like at the time of under-steer.
Figure 11:
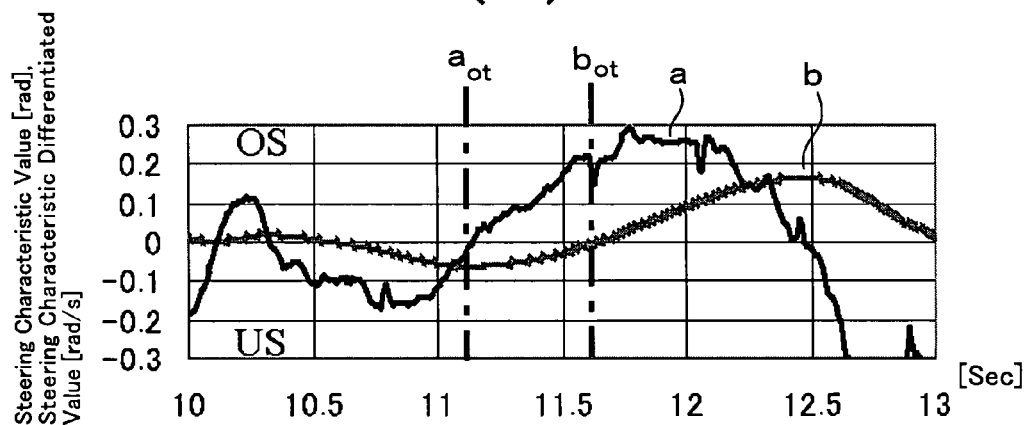
Figure 11:
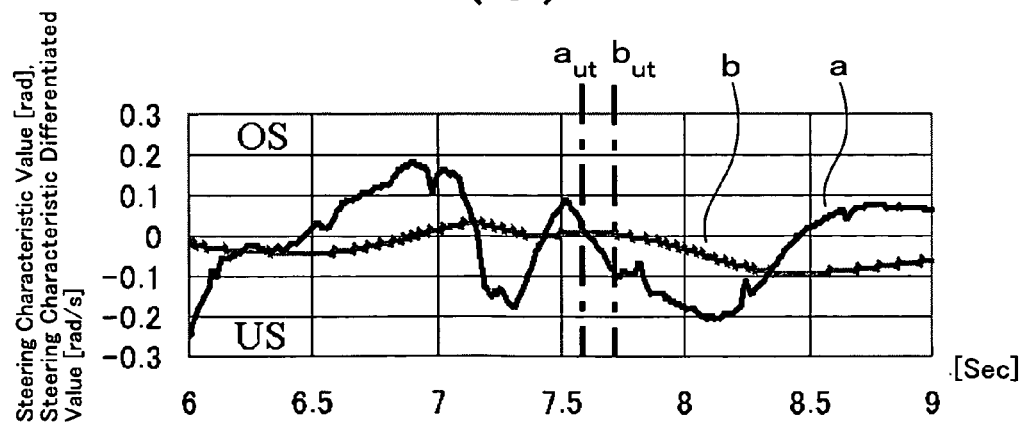

FIG. 11 shows the characteristics such as the steering characteristic value, steering characteristic differentiated value and the like when the steering characteristic is determined through the steering characteristic value determination processing shown in FIG. 10. FIG. 11 corresponds to FIG. 8 which indicates the steering characteristic value and steering characteristic differentiated value and the like to the steering characteristic determination processing shown in FIG. 5.

FIG. 11(A) indicates the same steering angle characteristic as FIG. 8(A). FIG. 11(B) corresponds to the steering characteristic value and steering characteristic differentiated value at the time of over-steer shown in FIG. 8(B) and FIG. 11(C) corresponds to the steering characteristic value and steering characteristic differentiated value at the time of under steer shown in FIG. 8(C). Meanwhile, FIGS. 11(B), (C) are different from FIGS. 8(B), (C) relating to the slip angle differential in terms of the characteristic relating to the yaw rate differential value.

Even if the steering characteristic is determined through the steering characteristic determination processing shown in FIG. 10, that determination is carried out based on a steering characteristic differentiated value a subjected to differentiation in step S503 and therefore, the steering characteristic, that is, which the motion condition of the vehicle is moved to over-steer or under-steer can be determined early. Thus, as shown in FIGS. 11(B), (C), the control start timing $a_{ot}$ (about 11.1 seconds), $a_{ut}$ (about 7.6 seconds) can be obtained early as compared to the control start timing $b_{ot}$ (about 11.6 seconds), $b_{ut}$ (about 7.75 seconds) by the conventional steering characteristic value b not subjected to the differentiation.

Further, other second example of the steering characteristic determination processing in step S103 shown in FIG. 4 will be described with reference to FIGS. 3, 12, 13. In the meantime, the steering characteristic determination processing shown in FIG. 12 is carried out through the steering characteristic arithmetic operation processing 30a2 in the AFS control arithmetic operation 30a by the EPS_ECU 30 like the steering characteristic determination processing shown in FIG. 5.

Figure 12:
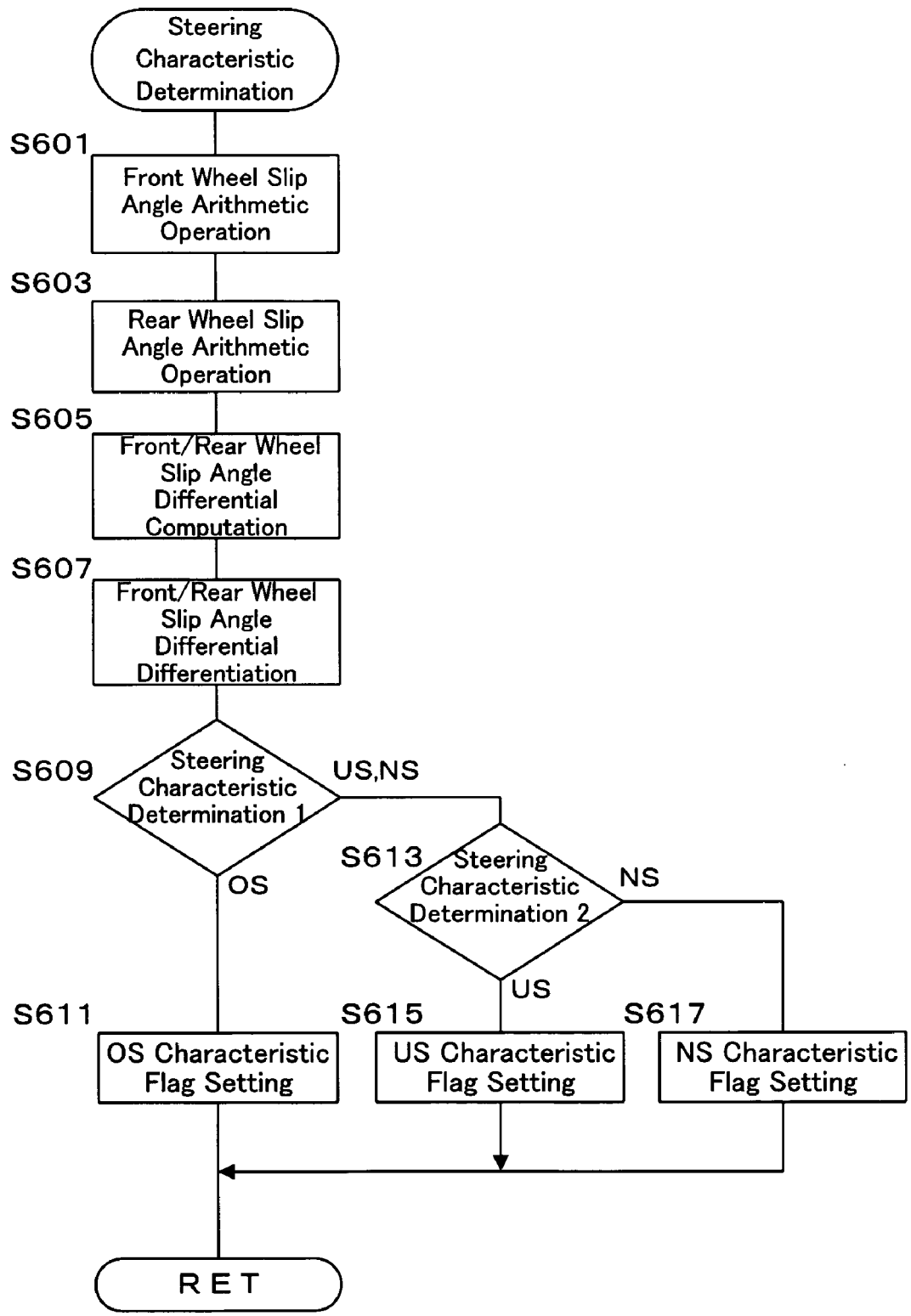
FIG. 12 is a flow chart showing a second example of the steering characteristic determination processing shown in FIG. 5.

According to the other second example of the steering characteristic determination processing as shown in FIG. 12, a processing for computing the slip angles of the front wheels FR, FL is carried out in step S601 and in subsequent step S603, a processing for computing the slip angles of the rear wheels RR, RL is carried out. That is, a front wheel slip angle $\beta_f$ is computed according to the expression (4) and a rear wheel slip angle $\beta_r$ is computed according to the expression (5).

In next step S605, a processing for computing a difference between the front and rear slip angles is carried out. That is, a processing for computing a front wheel slip angle $\beta_f$ with respect to a rear wheel slip angle $\beta_r$ is executed. This difference $(\beta_r-\beta_f)$ is equal to the slip angle differential value $\beta_{fr}$ obtained by the slip angle differential computation (S201) in the steering characteristic determination processing shown in FIG. 5. The respective processings in steps S601, S603, S605 may correspond to the "behavior amount acquiring step" described in the scope for patent in "CLAIMS".

In subsequent step S607, an arithmetic operation for differentiating a front/rear slip angle differential value $(\beta_r-\beta_f)$ obtained in step S605 is carried out. Because the phase of the front/rear slip angle differential value can be advanced by this differentiation, the transition tendency of the steering characteristic can be determined early by the steering characteristic determination by next step S609 or S613. The processing by this step S607 may correspond to the "differentiation step" described in the scope for patent in "CLAIMS".

Subsequent steps S609, S611, S613, S615, S617 correspond to steps S205, S207, S209, S211, S213 contained in the steering characteristic determination processing shown in FIG. 5 and a detailed description thereof is omitted.

The determination condition expression in the steering characteristic determination 1 in step S609 is (front/rear slip angle differential value>OS threshold) or (front/rear slip angle differential value>weak US threshold and differential differentiated value>0). The determination condition expression in the steering characteristic determination 2 by step S613 is (front/rear slip angle differential value<US threshold) or (front/rear slip angle differential value<weak OS threshold and differential differentiated value<0). The processing by step S609 may correspond to the "steering characteristic determination step, over-steer characteristic determination step" described in the scope for patent in "CLAIMS". The processing by step S613 may correspond to the "steering characteristic determination step, under-steer characteristic determination step" described in the scope for patent in "CLAIMS".

Figure 13:
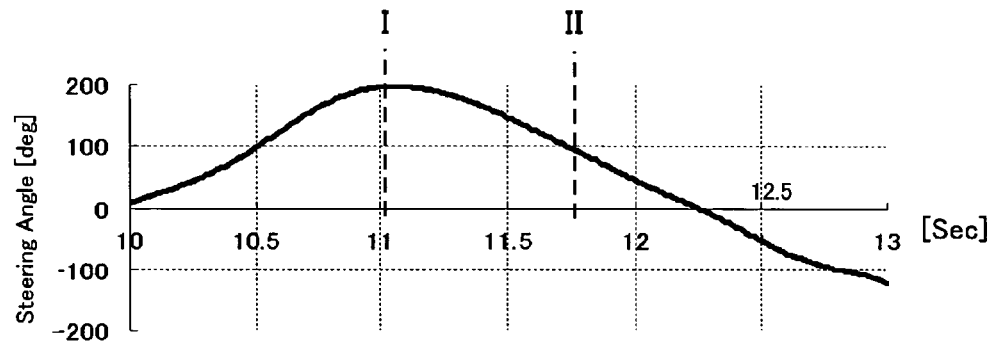
FIG. 13(A) is a characteristic diagram showing changes in the steering angle with respect to time when the steering characteristic determination processing shown in FIG. 12 is executed.
FIG. 13(B) is a characteristic diagram showing changes in the steering characteristic value and the like at the time of over steer.
FIG. 13(C) is a characteristic diagram showing the steering characteristic value and the like at the time of under steer.
Figure 13:
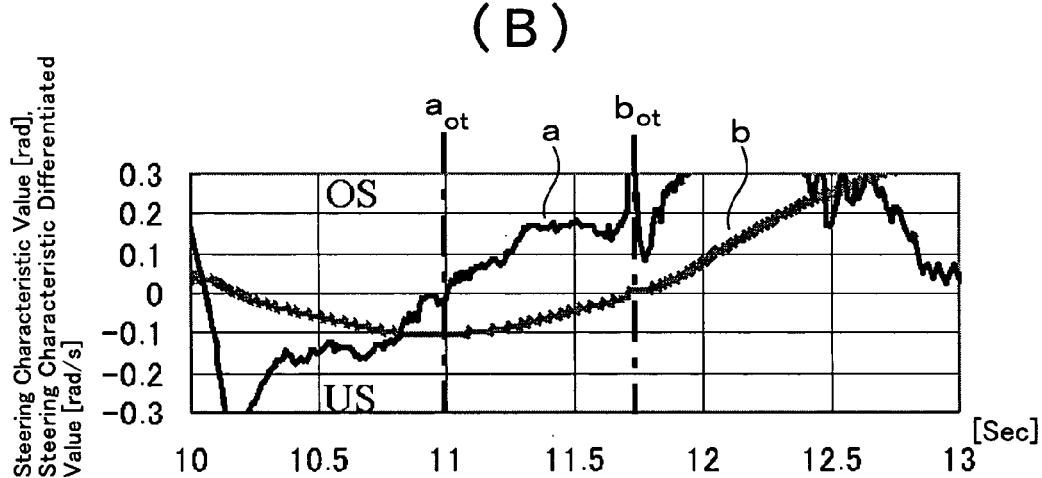
Figure 13:
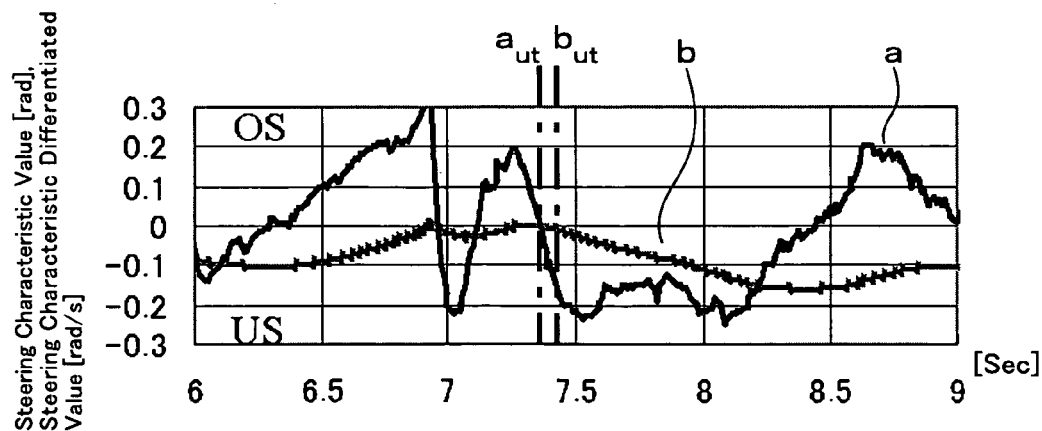

FIG. 13 shows characteristics such as the steering characteristic value, steering characteristic differentiated value when the steering characteristic is determined by the steering characteristic determination processing shown in FIG. 12. FIG. 13 corresponds to FIG. 8 which indicates the steering characteristic value, steering characteristic differentiated value to the steering characteristic determination processing shown in FIG. 5.

FIG. 13(A) indicates the same steering angle characteristic as FIG. 8(A). FIG. 13(B) corresponds to the steering characteristic value and steering characteristic differentiated value at the time of over-steer shown in FIG. 8(B) and FIG. 13(C) corresponds to the steering characteristic value and steering characteristic differentiated value at the time of under steer shown in FIG. 8(C). Meanwhile, FIGS. 13(B), (C) are different from FIGS. 8(B), (C) relating to the slip angle differential value $\beta_{fr}$ obtained directly from the expression (6) in terms of the characteristic relating to the front/rear slip angle differential value $(\beta_r-\beta_f)$ obtained indirectly from the expressions (4), (5).

Even if the steering characteristic is determined through the steering characteristic determination processing shown in FIG. 12, that determination is carried out based on a steering characteristic differentiated value a subjected to differentiation in step S607 and therefore, the steering characteristic, that is, which the motion condition of the vehicle is moved to over-steer or under-steer can be determined early. Thus, as shown in FIGS. 13(B), (C), the control start timing $a_{ot}$ (about 11.1 seconds), $a_{ut}$ (about 7.35 seconds) can be obtained early as compared to the control start timing $b_{ot}$ (about 11.75 seconds), $b_{ut}$ (about 7.4 seconds) by the conventional steering characteristic value b not subjected to the differentiation.

As described above, according to the vehicle motion control apparatus 20 of this embodiment, the steering characteristic of the vehicle is determined through the steering characteristic arithmetic operation processing 30a2 by the EPS_ECU 30 based on the slip angle differential value $\beta_{fr}$ which is a behavior amount of the vehicle which occurs around the z-axis in the vertical direction with the vehicle body and a behavior amount differentiated value obtained by differentiating the yaw rate differential value $(r-r_s)$ (S103). Consequently, the phases of the slip angle differential value $\beta_{fr}$ and the yaw rate differential value $(r-r_s)$ are advanced, so that the transition tendency of the steering characteristic, that is, which the motion condition of the vehicle is moved to over-steer or under-steer can be obtained early. Therefore, the startup timing of the vehicle steering control or drive power control can be accelerated, the behavior stability of the vehicle can be improved. Particularly, the transition tendency when the steering characteristic is changed from the neutral-steer or a condition near neutral-steer to the over-steer or under-steer can be obtained early.

The VGRS of the vehicle motion control apparatus 20 of this embodiment is activated according to an ACT angle instruction output (S119) which controls the gear ratio changing mechanism 32 for changing the transmission ratio by driving the motor 32, provided on the midway between the steering shaft 22 which connects the steering wheel 21 and the steered wheels FR, FL and the pinion shaft 23. Consequently, even if the control for enhancing the behavior stability of the vehicle is carried out in the VGRS, spin preventing control such as counter steer control can be early started based on the tendency of the steering characteristic obtained early. Thus, not only the behavior stability of the vehicle can be improved, but also it is possible to suppress a feeling of disharmony in steering, which may be provided to a skilled vehicle driver having a high-level driving technique.

Figure 14:
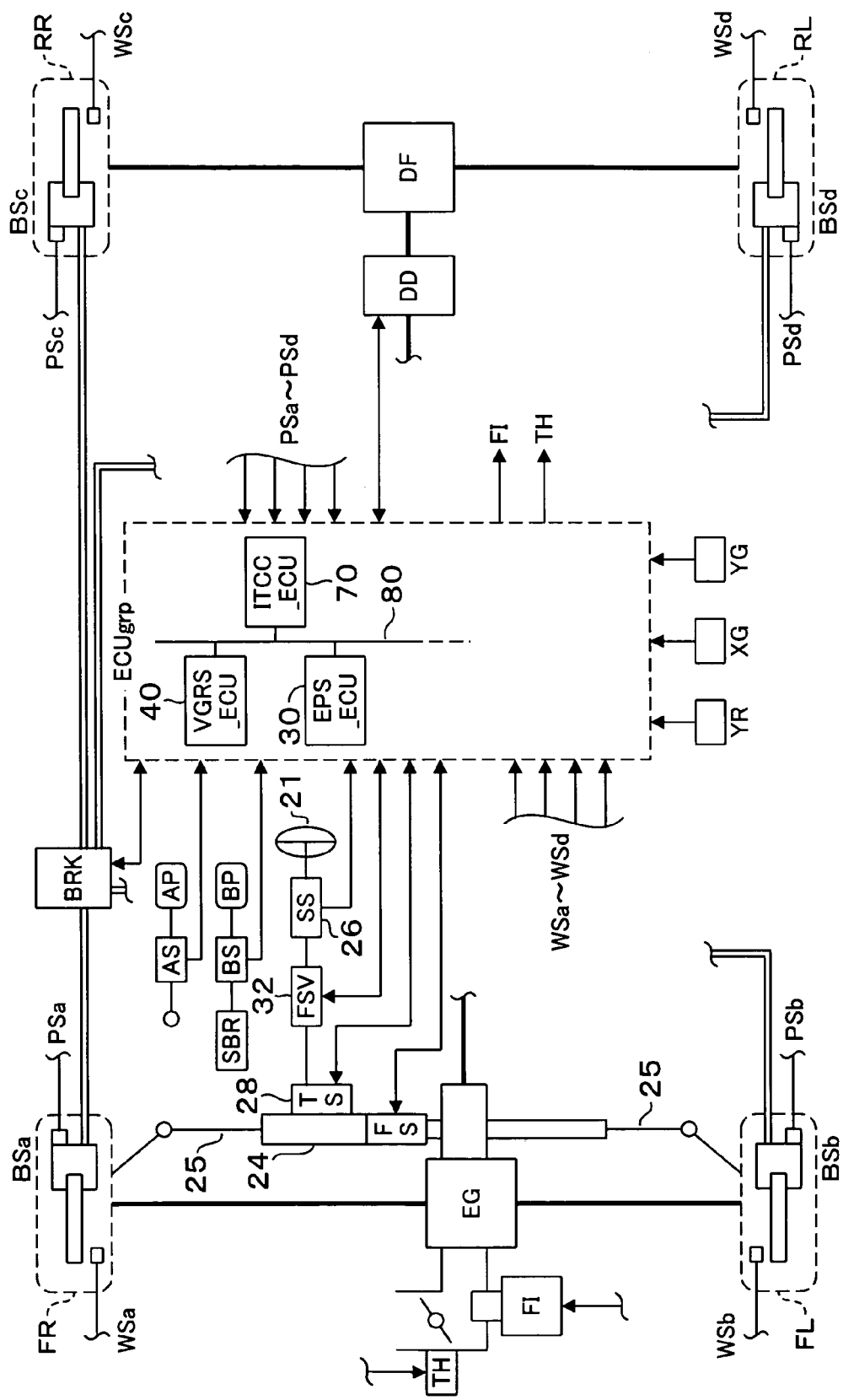
FIG. 14 is a block diagram showing the entire structure of the vehicle motion control system.

Meanwhile, the vehicle motion control apparatus 20 described above can be applied to vehicle motion control system constituted of front wheel steering control system which is controlled by the EPS_ECU 30, front wheel steering angle changing system which is controlled by the VGRS_ECU 40 and drive power distribution system which is controlled by ITCC_ECU 70 as shown in FIG. 14. In the meantime, plural ECUs comprised of the EPS_ECU 30, VGRS_ECU 40, ITCC_ECU 70 and the like constitute ECU group such that they are connected to each other through the intra-vehicle network 80.

The front wheel steering control system corresponds to the above-described electrically-driven steering unit (EPS) and computes an assist torque based on steering torque detected by the torque sensor 28, vehicle velocity detected by vehicle wheel velocity sensors WSa-WSd and the like by means of the EPS_ECU 30 and at the same time, control on generating the assist torque is executed with the EPS actuator 24. Consequently, assisting for the steering force depending on the vehicle velocity and the like is enabled thereby reducing the vehicle driver's load on handling the steering wheel 21.

The front wheel steering angle changing system corresponds to the aforementioned VGRS and computes the variable gear ratio of the gear ratio changing mechanism 32 based on the steering torque detected by the steering angle sensor 26, the yaw rate (behavior amount of the vehicle) detected by the yaw rate sensor YS, the vehicle velocity detected by the vehicle wheel velocity sensors WSa-WSd and the like through the VGRS_ECU 40 and controls for setting of the gear ratio on the gear ratio changing mechanism 32. Consequently, the steering control corresponding to the vehicle velocity or vehicle behavior amount is enabled, thereby improving the steering stability assured by the vehicle driver.

The drive power distribution system corresponds to the electronic control 4-wheel drive coupling (herein after referred to as "ITCC") and computes a drive power distribution ratio between the front and rear wheels by the drive power transmission unit DD based on the pressing amount of an accelerator pedal AP detected by the pressing amount sensor AS, vehicle wheel velocity, friction coefficient or yaw rate sensor YS detected by the vehicle wheel velocity sensors WSa-WSd, behavior amount of the vehicle detected by the front/rear acceleration sensor XG, lateral acceleration sensor YG and the like through the ITCC_ECU 70. Further, it controls for setting of the drive power distribution ratio in the drive power transmission unit DD. Consequently, the drive power transmission control corresponding to road surface condition or behavior amount of the vehicle is enabled, so that an appropriate drive torque is secured by front/rear distribution of the drive power corresponding to the road surface condition, thereby improving the startup acceleration, directional stability and swiveling stability. In the meantime, ITCC is a registered trade mark.

For the apparatus which executes steering control (VGRS) of the vehicle or its drive power control (ITCC) based on the steering characteristic obtained based on the behavior amount of the vehicle detected by the yaw rate sensor YS, that is, the behavior amount of the vehicle which occurs around an axis in the vertical direction with respect to the vehicle body, the steering characteristic arithmetic operation processing 30a2 by the EPS_ECU 30 of this embodiment can be applied.

That is, by any one of the steering characteristic determination processings shown in FIGS. 5, 10, 12, the behavior amount is differentiated and the steering characteristic of the vehicle is determined based on that behavior amount differentiated value. Consequently, the phase of the behavior amount is progressed when the behavior amount of the vehicle is differentiated. Thus, the transition tendency of the steering characteristic, that is, which the motion condition of the vehicle is moved to over-steer or under-steer, can be obtained early. Therefore, control start timing for the steering control by the VGRS or drive power control by the ITCC can be accelerated thereby improving the steering control of the vehicle and behavior stability by drive power control.

Meanwhile, the EPS_ECU 30, VGRS_ECU 40 and ITCC_ECU 70 may correspond to "behavior amount acquiring step, differentiation step, steering characteristic determination step, over-steer characteristic determination step, under-steer characteristic determination step, object control amount arithmetic operation step, proportional control amount arithmetic operation step, proportional control amount zero setting step, transmission ratio changing control step, behavior amount acquiring means, differentiation means, steering characteristic determination means, over-steer characteristic determination means, under-steer characteristic determination means, object control amount arithmetic operation means, proportional control amount arithmetic operation means, proportional control amount zero setting means, and transmission ratio changing control means" described in the scope for patent in "CLAIMS".

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A vehicle motion control method for executing steering control or drive power control for the vehicle based on steering characteristic of the vehicle obtained based on the behavior amount of the vehicle which occurs around an axis in the vertical direction with respect to the vehicle body, comprising:

behavior amount acquiring step of acquiring the behavior amount of said vehicle;

differentiation step of obtaining a behavior amount differentiated value by differentiating said behavior amount; and steering characteristic determination step of determining said vehicle steering characteristic based on said behavior amount differentiated value, wherein said steering characteristic determination step contains over-steer characteristic determination step in which even if said behavior amount falls under the under-steer characteristic, if it exceeds a predetermined under-steer determination value in the vicinity of neutral steer determination value while said behavior amount differentiated value is positive, it is determined that the steering characteristic is over-steer; and under-steer characteristic determination step in which even if said behavior amount falls under the over-steer characteristic, if it is below a predetermined over-steer determination value in the vicinity of neutral steer determination value while said behavior amount differentiated value is negative, it is determined that the steering characteristic is under-steer.

2. The vehicle motion control method according to claim 1 wherein said behavior amount is a difference in angle between the front wheel slip angle of a front wheel of said vehicle and the rear wheel slip angle of a rear wheel of said vehicle.

3. The vehicle motion control method according to claim further comprising:

object control amount arithmetic operation step of computing an object control amount which is an object value for the steering control or drive power control of said vehicle;

proportional control amount arithmetic operation step of computing a proportional control amount based on a difference between said behavior amount and said object control amount; and proportional control amount zero setting step for, when said proportional control amount acts on control which intensifies the over-steer when the over-steer of said vehicle is suppressed, setting the proportional control amount to substantially zero.

4. The vehicle motion control method according to claim 2 wherein said steering control is carried out by transmission ratio changing control step for controlling the transmission ratio changing means which is located in the midway of steering transmission system connecting the steering wheel to the steered vehicle wheel for changing the transmission ratio by driving an electric motor.

5. The vehicle motion control method according to claim 1 further comprising:
   object control amount arithmetic operation step of computing an object control amount which is an object value for the steering control or drive power control of said vehicle;
   proportional control amount arithmetic operation step of computing a proportional control amount based on a difference between said behavior amount and said object control amount; and
   proportional control amount zero setting step for, when said proportional control amount acts on control which intensifies the over-steer when the over-steer of said vehicle is suppressed, setting the proportional control amount to substantially zero.

6. The vehicle motion control method according to claim 1 wherein said steering control is carried out by transmission ratio changing control step for controlling the transmission ratio changing means which is located in the midway of steering transmission system connecting the steering wheel to the steered vehicle wheel for changing the transmission ratio by driving an electric motor.

7. A vehicle motion control method for executing steering control or drive power control for the vehicle based on steering characteristic of the vehicle obtained based on the behavior amount of the vehicle which occurs around an axis in the vertical direction with respect to the vehicle body, comprising:
   behavior amount acquiring step of acquiring the behavior amount of said vehicle;
   differentiation step of obtaining a behavior amount differentiated value by differentiating said behavior amount; and
   steering characteristic determination step of determining said vehicle steering characteristic based on said behavior amount differentiated value, wherein said behavior amount is a difference in angle between the front wheel slip angle of a front wheel of said vehicle and the rear wheel slip angle of a rear wheel of said vehicle, and
   wherein said steering characteristic determination step contains over-steer characteristic determination step in which even if said behavior amount falls under the under-steer characteristic, if it exceeds a predetermined under-steer determination value in the vicinity of neutral steer determination value while said behavior amount differentiated value is positive, it is determined that the steering characteristic is over-steer; and under-steer characteristic determination step in which even if said behavior amount falls under the over-steer characteristic, if it is below a predetermined over-steer determination value in the vicinity of neutral steer determination value while said behavior amount differentiated value is negative, it is determined that the steering characteristic is under-steer.

8. The vehicle motion control method according to claim 7 wherein said steering control is carried out by transmission ratio changing control step for controlling the transmission ratio changing means which is located in the midway of steering transmission system connecting the steering wheel to the steered vehicle wheel for changing the transmission ratio by driving an electric motor.

9. A vehicle motion control apparatus for executing steering control or drive power control for the vehicle based on steering characteristic of the vehicle obtained based on the behavior amount of the vehicle which occurs around an axis in the vertical direction with respect to the vehicle body, comprising:
   behavior amount acquiring means for acquiring the behavior amount of said vehicle;
   differentiation means for obtaining a behavior amount differentiated value by differentiating said behavior amount; and
   steering characteristic determination means for determining said vehicle steering characteristic based on said behavior amount differentiated values,
   wherein said steering characteristic determination means includes over-steer characteristic determination means in which even if said behavior amount exceeds a predetermined under-steer determination value while said behavior amount differentiated value is positive, it is determined that the steering characteristic is over-steer; and under-steer characteristic determination means in which even if said behavior amount is below a predetermined over-steer determination value while said behavior amount differentiated value is negative, it is determined that the steering characteristic is under-steer.

10. The vehicle motion control apparatus according to claim 9 wherein said behavior amount is a difference in angle between the front wheel slip angle of a front wheel of said vehicle and the rear wheel slip angle of a rear wheel of said vehicle.

11. The vehicle motion control method according to claim 10 further comprising:
    object control amount arithmetic operation means for computing an object control amount which is an object value for the steering control or drive power control of said vehicle;
    proportional control amount arithmetic operation means for computing a proportional control amount based on a difference between said behavior amount and said object control amount; and
    proportional control amount zero setting means for, when said proportional control amount acts on control which intensifies the over-steer when the over-steer of said vehicle is suppressed, setting the proportional control amount to substantially zero.

12. The vehicle motion control apparatus according to claim 10 wherein said steering control is carried out by transmission ratio changing control means for controlling the transmission ratio changing means which is located in the midway of steering transmission system connecting the steering wheel to the steered vehicle wheel for changing the transmission ratio by driving an electric motor.

13. The vehicle motion control method according to claim 9 further comprising:
    object control amount arithmetic operation means for computing an object control amount which is an object value for the steering control or drive power control of said vehicle;
    proportional control amount arithmetic operation means for computing a proportional control amount based on a difference between said behavior amount and said object control amount; and
    proportional control amount zero setting means for, when said proportional control amount acts on control which intensifies the over-steer when the over-steer of said vehicle is suppressed, setting the proportional control amount to substantially zero.

14. The vehicle motion control apparatus according to claim 9 wherein said steering control is carried out by transmission ratio changing control means for controlling the transmission ratio changing means which is located in the midway of steering transmission system connecting the steering wheel to the steered vehicle wheel for changing the transmission ratio by driving an electric motor.

15. A vehicle motion control apparatus for executing steering control or drive power control for the vehicle based on steering characteristic of the vehicle obtained based on the behavior amount of the vehicle which occurs around an axis in the vertical direction with respect to the vehicle body, comprising:
behavior amount acquiring means for acquiring the behavior amount of said vehicle;
differentiation means for obtaining a behavior amount differentiated value by differentiating said behavior amount; and
steering characteristic determination means for determining said vehicle steering characteristic based on said behavior amount differentiated value, wherein said behavior amount is a difference in angle between the front wheel slip angle of a front wheel of said vehicle and the rear wheel slip angle of a rear wheel of said vehicle,
wherein said steering characteristic determination means includes over-steer characteristic determination means in which even if said behavior amount exceeds a predetermined under-steer determination value while said behavior amount differentiated value is positive, it is determined that the steering characteristic is over-steer; and under-steer characteristic determination means in which even if said behavior amount is below a predetermined over-steer determination value while said behavior amount differentiated value is negative, it is determined that the steering characteristic is under-steer.

16. The vehicle motion control apparatus according to claim 15 wherein said steering control is carried out by transmission ratio changing control means for controlling the transmission ratio changing means which is located in the midway of steering transmission system connecting the steering wheel to the steered vehicle wheel for changing the transmission ratio by driving an electric motor.

* * * * *